United States Patent [19]

Fergason

[11] Patent Number: 5,715,029
[45] Date of Patent: *Feb. 3, 1998

[54] OPTICAL DITHERING SYSTEM USING BIREFRINGENCE FOR OPTICAL DISPLAYS AND METHOD

[76] Inventor: James L. Fergason, 92 Adam Way, Atherton, Calif. 94025

[*] Notice: The term of this patent shall not extend beyond the expiration date of Pat. No. 5,572,341.

[21] Appl. No.: 398,292

[22] Filed: Mar. 3, 1995

Related U.S. Application Data

[63] Continuation-in-part of Ser. No. 392,055, Feb. 22, 1995, Pat. No. 5,572,341, which is a continuation-in-part of Ser. No. 328,375, Oct. 25, 1994, Pat. No. 5,537,256.

[51] Int. Cl.⁶ .................. G02F 1/13; G02B 5/30; G02B 27/28
[52] U.S. Cl. .......................... 349/196; 359/495
[58] Field of Search .................. 359/39, 53, 63, 359/73, 94, 494, 495; 349/76, 96, 117, 196, 200

[56] References Cited

U.S. PATENT DOCUMENTS

| Re. 32,521 | 10/1987 | Fergason | 359/156 |
|---|---|---|---|
| 3,329,474 | 7/1967 | Harris et al. | 359/303 |
| 3,375,052 | 3/1968 | Kosanke et al. | 200/431 |
| 3,428,743 | 2/1969 | Hanlon | 348/856 |
| 3,439,348 | 4/1969 | Harris | 365/121 |
| 3,499,700 | 3/1970 | Harris et al. | 359/303 |
| 3,503,670 | 3/1970 | Kosanke et al. | 359/279 |
| 3,554,632 | 1/1971 | Chitayat | 385/116 |
| 4,012,116 | 3/1977 | Yevick | 359/465 |
| 4,110,794 | 8/1978 | Lester | 358/401 |
| 4,385,806 | 5/1983 | Fergason | 349/34 |
| 4,410,238 | 10/1983 | Hanson | 399/196 |
| 4,516,837 | 5/1985 | Soref | 359/39 |
| 4,540,243 | 9/1985 | Fergason | 359/156 |
| 4,648,691 | 3/1987 | Oguchi et al. | 349/162 |
| 4,649,425 | 3/1987 | Pund | 359/464 |
| 4,719,507 | 1/1988 | Bos | 348/57 |
| 4,755,038 | 7/1988 | Baker | 359/63 |
| 4,834,500 | 5/1989 | Hilsum et al. | 349/199 |
| 4,910,413 | 3/1990 | Tamune | 250/578.1 |
| 4,917,452 | 4/1990 | Liebowitz | 359/39 |
| 4,958,915 | 9/1990 | Okada et al. | 345/97 |
| 4,969,717 | 11/1990 | Mallison | 359/39 |
| 4,991,924 | 2/1991 | Shankar et al. | 349/196 |
| 5,012,274 | 4/1991 | Dolgoff | 345/88 |
| 5,013,140 | 5/1991 | Healey et al. | 359/39 |
| 5,074,647 | 12/1991 | Fergason et al. | 359/63 |
| 5,083,199 | 1/1992 | Borner | 359/464 |

(List continued on next page.)

FOREIGN PATENT DOCUMENTS

| 62-47623 | 3/1987 | Japan . |
|---|---|---|
| 63-13018 | 1/1988 | Japan . |
| 0198383 | 4/1989 | Japan . |
| 5289044 | 11/1993 | Japan . |

OTHER PUBLICATIONS

Miyai, "Liquid Crystal Inferlace Display Device", Patent Abstracts of Japan, vol. 18, No. 78, Nov. 5, 1995.
Maeda et al, "Display Device", Patent Abstracts of Japan, vol. 13, No. 358, Apr. 17, 1989.

*Primary Examiner*—William L. Sikes
*Assistant Examiner*—Toan Ton
*Attorney, Agent, or Firm*—Renner, Otto, Boisselle & Sklar, P.L.L.

[57] ABSTRACT

A passive dithering display system includes an optical display including a plurality of pixels with optical dead space between the pixels for producing an image, and a birefringent material for shifting one polarization component of the image relative to a second polarization component of the image such that the shifted polarization component lies in the dead space. Thus, the system of the invention can change the location of an optical signal, and the change can be used to improve resolution of a display, to reduce fixed pattern noise of a display, to facilitate locating and hiding of circuitry, to facilitate overlapping of tiles or pixels, etc.

9 Claims, 10 Drawing Sheets

U.S. PATENT DOCUMENTS

| | | | |
|---|---|---|---|
| 5,128,782 | 7/1992 | Wood | 349/61 |
| 5,138,449 | 8/1992 | Kerpchar | 348/443 |
| 5,187,603 | 2/1993 | Bos | 359/93 |
| 5,300,942 | 4/1994 | Dolgoff | 345/32 |
| 5,305,146 | 4/1994 | Nakagaki et al. | 359/634 |
| 5,311,217 | 5/1994 | Guerin | 347/246 |
| 5,357,369 | 10/1994 | Pilling et al. | 348/443 |
| 5,369,266 | 11/1994 | Nohda et al. | 250/208.1 |
| 5,436,755 | 7/1995 | Guerin | 359/299 |

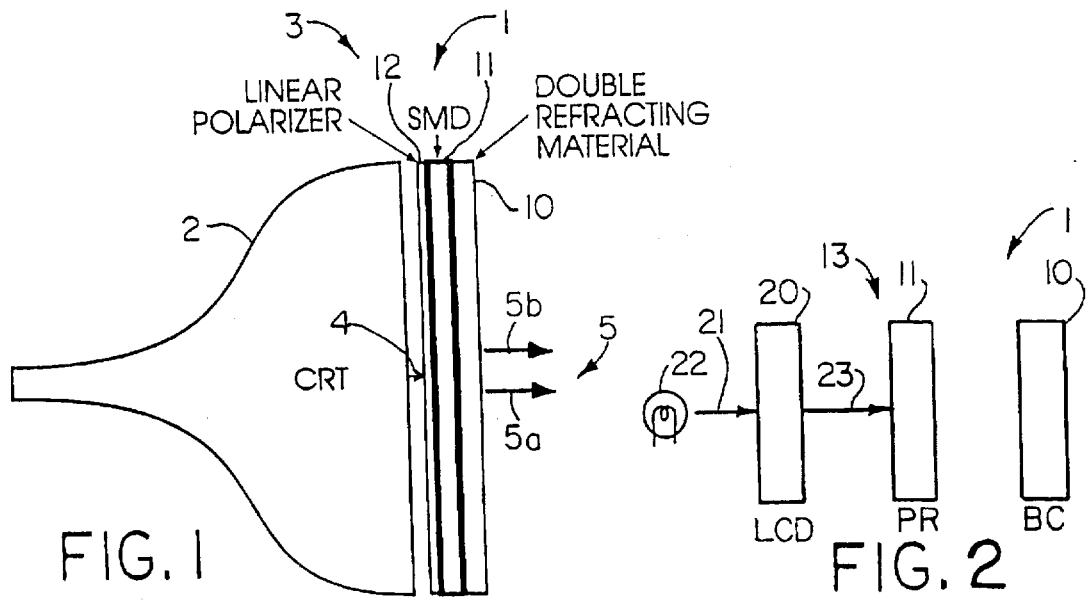
FIG. 1
FIG. 2
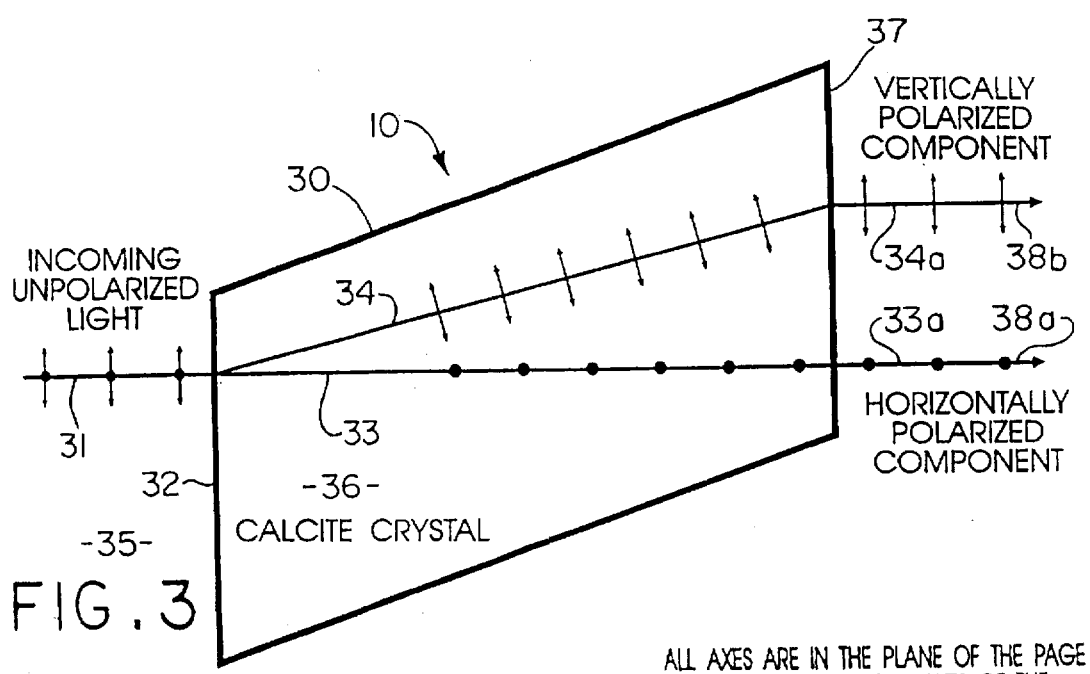
FIG. 3
ALL AXES ARE IN THE PLANE OF THE PAGE EXCEPT THE VERTICAL AXES OF THE DOUBLE REFRACTING MATERIAL WHICH TIPS IN/OUT OF THE PLANE OF THE PAGE
AXES OF THE COMPONENTS
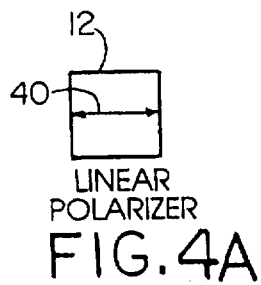
FIG. 4A
LINEAR POLARIZER
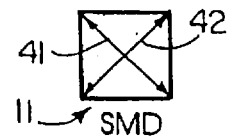
FIG. 4B
SMD
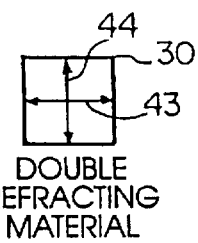
FIG. 4C
DOUBLE REFRACTING MATERIAL

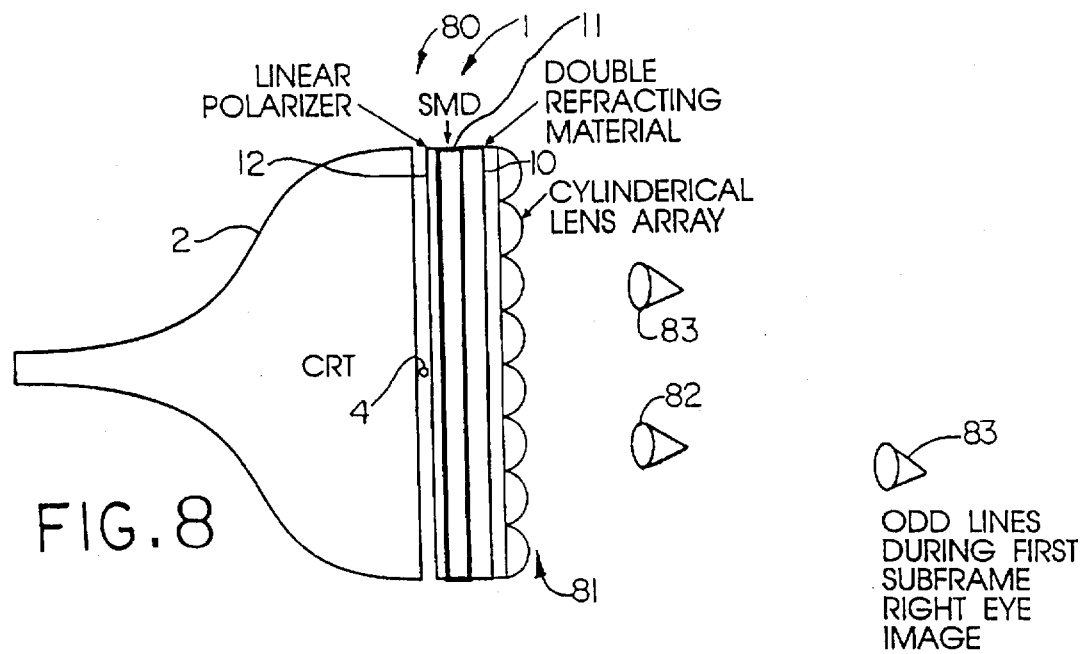
FIG. 8
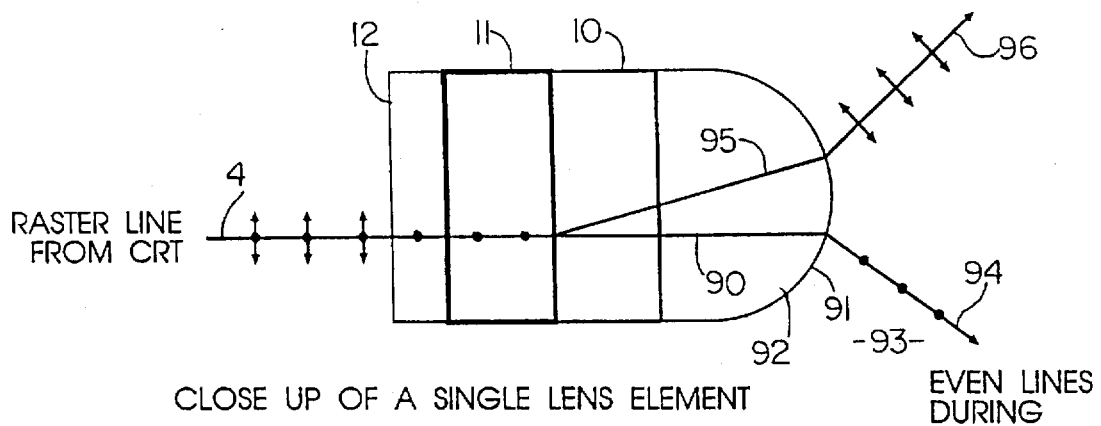
CLOSE UP OF A SINGLE LENS ELEMENT
FIG. 9
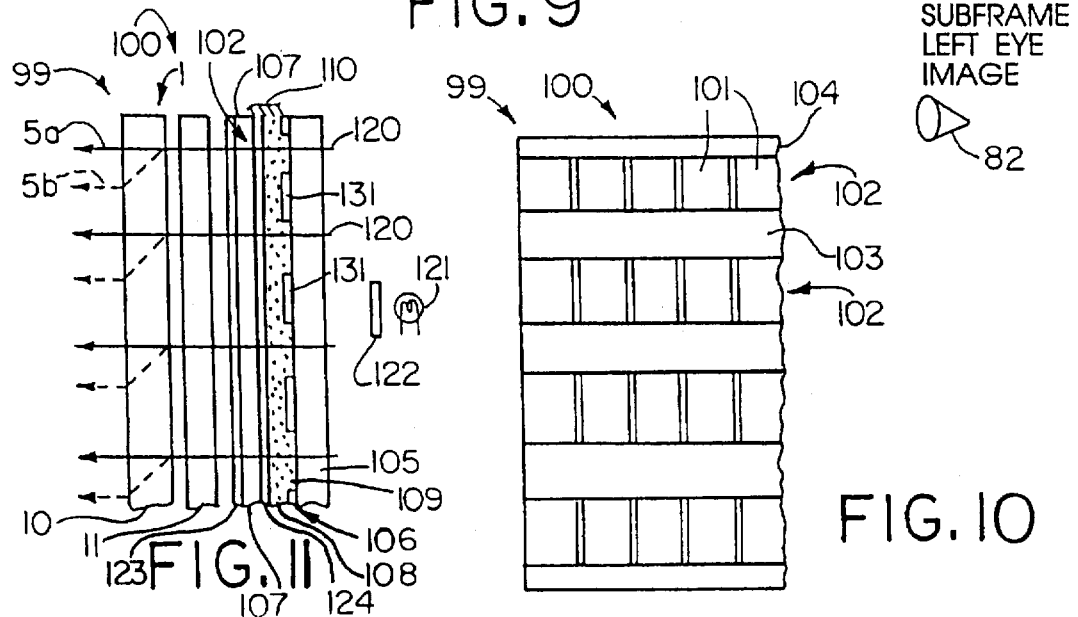
FIG. 10
FIG. 11

ONE POSSIBLE SET OF ORIENTATIONS FOR THE AXES OF THE UNENERGIZED COMPONENTS

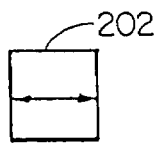
LINEAR POLARIZER TRANSMISSION AXIS HORIZONTAL
FIG.15A

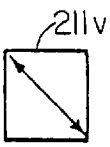
SMD VARIABLE RETARDER #1 OPTIC AXIS AT −45°
FIG.15B

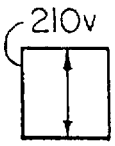
DOUBLE REFRACTING LAYER #1 OPTIC AXIS VERTICAL
FIG.15C

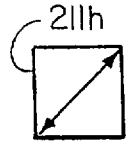
SMD VARIABLE RETARDER #2 OPTIC AXIS AT +45°
FIG.15D

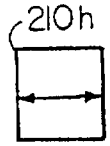
DOUBLE REFRACTING LAYER #2 OPTIC AXIS HORIZONTAL
FIG.15E

FIRST SUB-FRAME   SMD #1 HIGH VOLTAGE   SMD #2 LOW VOLTAGE

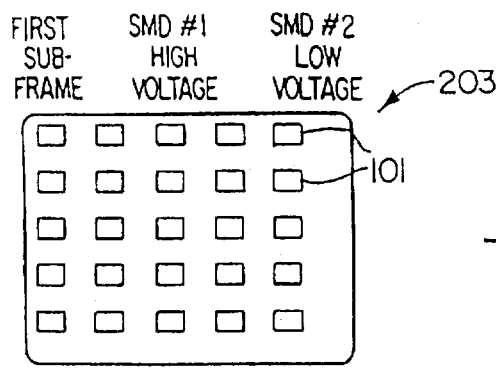

FIG.16A

SECOND SUB-FRAME   SMD #1 HIGH VOLTAGE   SMD #2 HIGH VOLTAGE

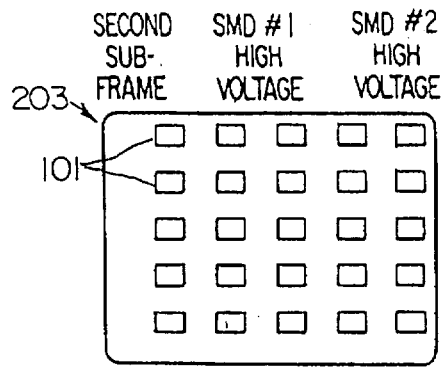

FIG.16B

FOURTH SUB-FRAME   SMD #1 LOW VOLTAGE   SMD #2 HIGH VOLTAGE

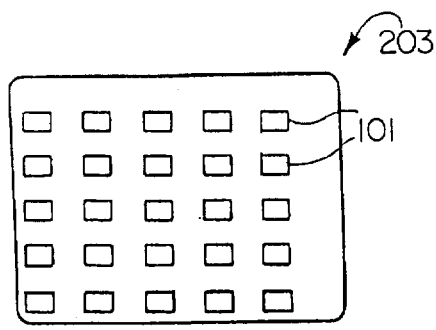

FIG.16D

THIRD SUB-FRAME   SMD #2 LOW VOLTAGE   SMD #1 LOW VOLTAGE

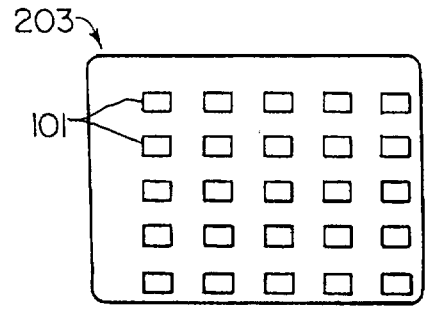

FIG.16C

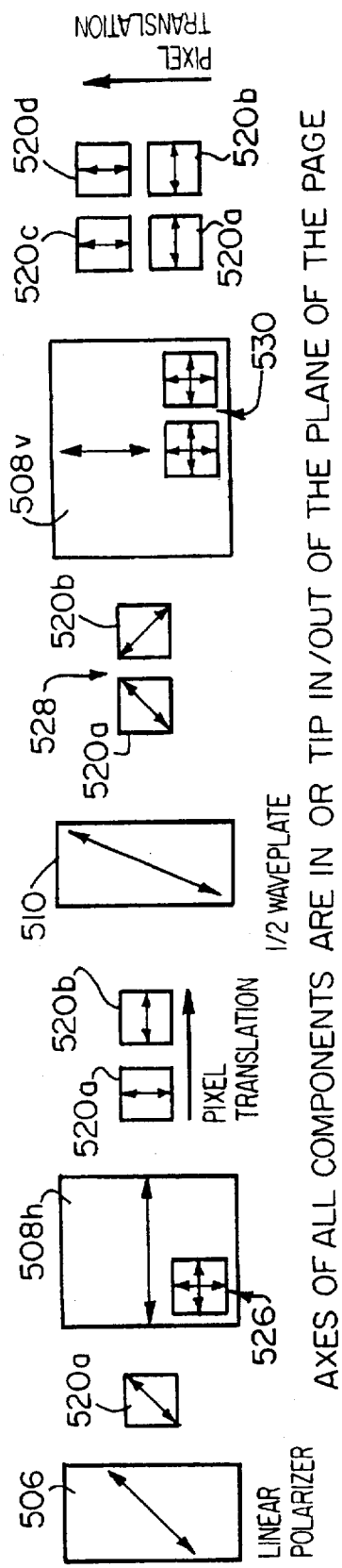
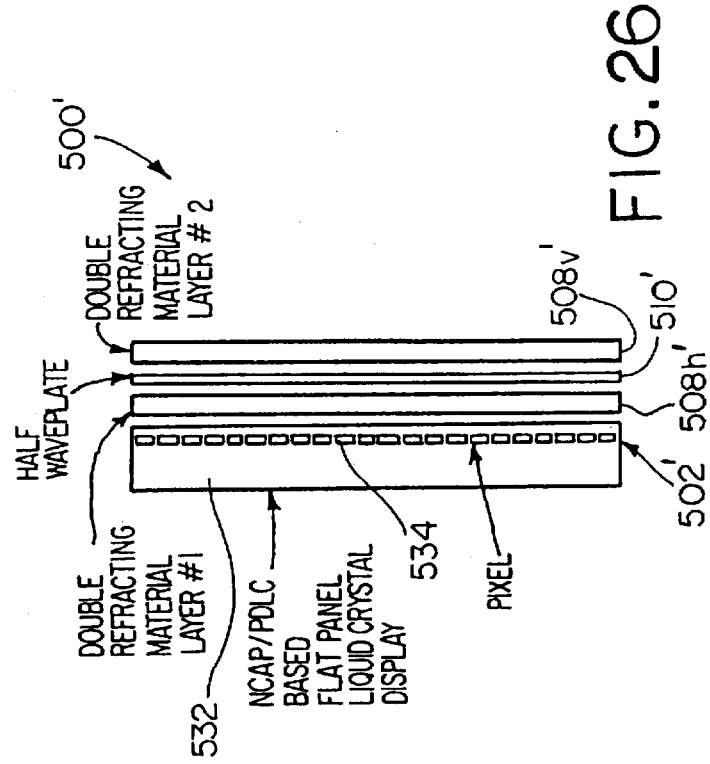
FIG. 25
FIG. 26

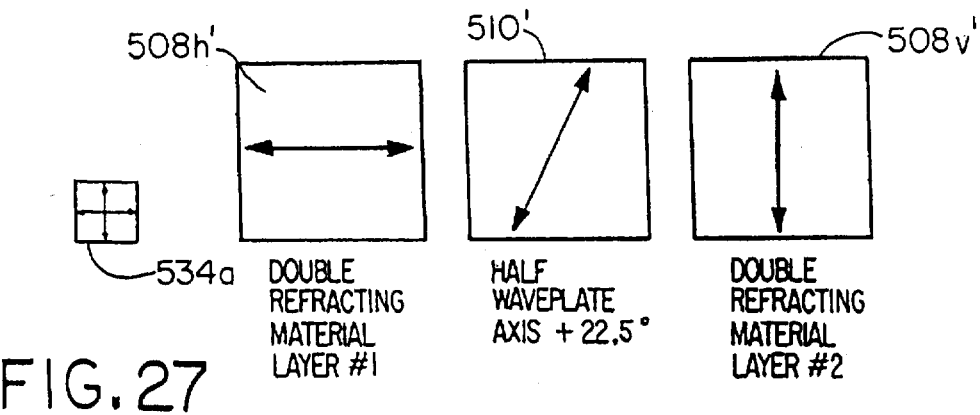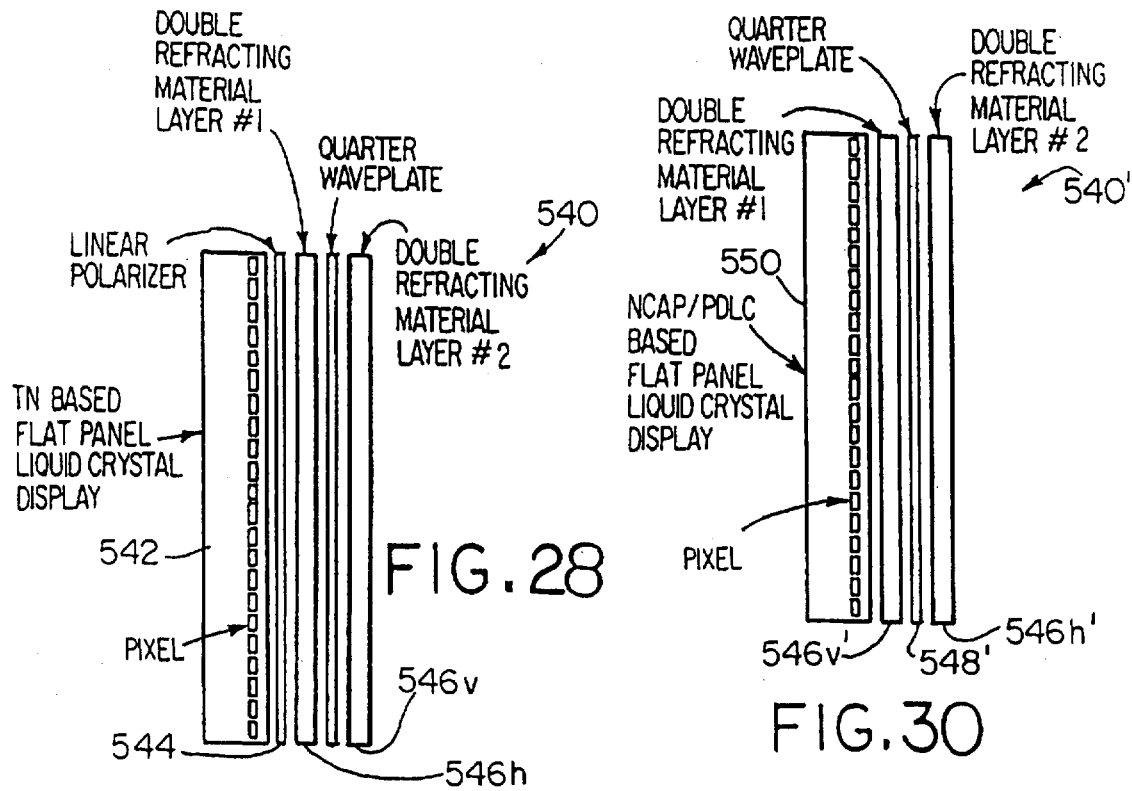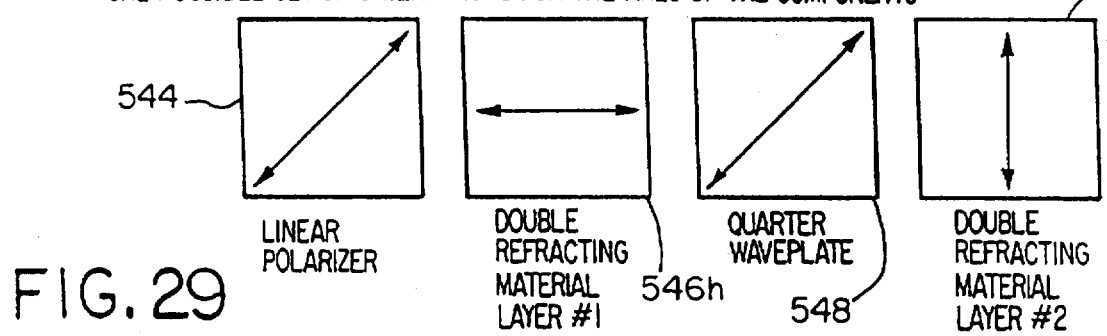

OPTICAL DITHERING SYSTEM USING BIREFRINGENCE FOR OPTICAL DISPLAYS AND METHOD

This is a continuation-in-part of commonly owned U.S. patent application Ser. No. 08/392,055, filed Feb. 22, 1995, now U.S. Pat. No. 5,572,341, naming James L. Fergason as the inventor, which is a continuation-in-part of commonly owned U.S. patent application Ser. No. 08/328,375, filed Oct. 25, 1994, now U.S. Pat. No. 5,537,256 the entire disclosures of which hereby are incorporated by reference.

TECHNICAL FIELD

The present invention relates generally, as is indicated, to electro-optical dithering systems for optical displays and methods, and, more particularly, to dithering systems and methods for changing the location of an optical signal and for improving an optical display.

BACKGROUND

Dithering systems have been used in a number of technologies in the past. The objective of a dithering system is to change a characteristic of a particular signal in a periodic (or random) fashion in order to provide a useful output. As is described in further detail, the dithering system of the invention may be used to change the relative location of an optical signal.

The present invention may be used with various types of displays and systems. Exemplary displays are a CRT (sometimes referred to herein as cathode ray tube) display, a liquid crystal display (sometimes referred to herein as "LCD"), especially those which modulate light transmitted therethrough, reflective liquid crystal displays, light emitting displays, such as electroluminescent displays, plasma displays and so on.

Conventional optical displays typically display graphic visual information, such as computer generated graphics, and pictures generated from video signals, such as from a VCR, from a broadcast television signal, etc.; the pictures may be static or still or they may be moving pictures, as in a movie or in a cartoon, for example. Conventional displays also may present visual information of the alphanumeric type, such as numbers, letters, words, and/or other symbols (whether in the English language or in some other language). Visual information viewed by a person (or by a machine or detector) usually is in the form of visible light. Such visible light is referred to as a light signal or an optical signal. The term optical signal with which the invention may be used includes visible light, infrared light, and ultraviolet light, the latter two sometimes being referred to as electromagnetic radiation rather than light. The optical signal may be in the form of a single light ray, a light beam made up of a plurality of light rays, a light signal such as a logic one or a logic zero signal used in an optical computer, for example, or the above-mentioned alphanumeric or graphics type display. Thus, as the invention is described herein, it is useful with optical signals of various types used for various purposes. Therefore, in the present invention reference to optical signal, light ray, light beam, light signal, visual information, etc., may be used generally equivalently and interchangeably.

In an exemplary liquid crystal display sometimes referred to as an image source, there usually are a plurality of picture elements, sometimes referred to as pixels or pels, and these pixels can be selectively operated to produce a visual output in the form of a picture, alphanumeric information, etc.

Various techniques are used to provide signals to the pixels. One technique is to use a common electrode on one plate of a liquid crystal cell which forms the display and an active matrix electrode array, such as that formed by thin film transistors (TFT), on the other plate of the liquid crystal cell. Various techniques are used to provide electrical signals to the TFT array to cause a particular type of optical output from respective pixels. Another technique to provide signals to the pixels is to use two arrays of crossed electrodes on respective substrates of an LCD; by applying or not applying a voltage or electric field between a pair of crossed electrodes, a particular optical output can be obtained.

One factor in determining resolution of a liquid crystal display is the number of pixels per unit area of the liquid crystal display. For example, Sony Corporation recently announced a 1.35 inch diagonal high resolution liquid crystal display which has 513,000 pixels arranged in 480 rows of 1,068 pixels per row.

Another factor affecting resolution is the space between adjacent pixels sometimes referred to "as optical dead space". Such space ordinarily is not useful to produce an optical signal output. The space usually is provided to afford a separation between the adjacent pixels to avoid electrical communication between them. The space also is provided to accommodate circuitry, leads, and various electrical components, such as capacitors, resistors, and even transistors or parts of transistors. The proportion of optical dead space to useful space of pixels that can produce optical output tends to increase as the physical size of the image source is decreased, for the space required to convey electrical signals, for example, may remain approximately constant although the actual size of the useful space of the pixels to produce optical output can be reduced because of anticipated image magnification. However, upon magnification of the image produced by such a miniature image source both the optical dead space and the useful optical space of the pixels are magnified. Thus, resolution tends to be decreased, especially upon such magnification.

The picture elements (pixels or pels) may be discrete pixels, blocks or areas where an optical signal can be developed by emission, reflection, transmission, etc. such as the numerous pixels in the miniature image source of Sony Corporation mentioned above. The optical signal referred to may mean that light is "on" or provided as an output from the device, or that the pixel has its other condition of not producing or providing a light output, e.g., "off"; and the optical signal also may be various brightnesses of light or shades of gray. Alternatively, the optical output or optical signal produced by a pixel may be a color or light of a particular color.

The pixels may be a plurality of blocks or dots arranged in a number of lines or may be a number of blocks or dots randomly located or grouped in a pattern on the display or image source (source of the optical signal). The pixels may be a number of lines or locations along the raster lines that are scanned in a CRT type device or the pixels may be one or a group of phosphor dots or the like at particular locations, such as along a line in a CRT or other device.

The optical signal produced by one or more pixels may be the delivery of light from that pixel or the non-delivery of light from that pixel, or various brightnesses or shades of gray. To obtain operation of a pixel, for example, the pixel may be energized or not. In some devices energizing the pixel may cause the pixel to provide a light output, and in other devices the non-energizing of the pixel may cause the providing of a light output; and the other energized condition may cause the opposite light output condition. It also is possible that the nature of the light output may be dependent on the degree of energization of a pixel, such as by providing the pixel with a relatively low voltage or relatively high voltage to obtain respective optical output signals (on and off or off and on, respectively).

For example, in a conventional twisted nematic liquid crystal display device, polarized light is received by a liquid crystal cell, and depending on whether the liquid crystal cell receives or does not receive a satisfactory voltage input, the plane of polarization of the light output by the liquid crystal cell will or will not be rotated; and depending on that rotation (or not) and the relative alignment of an output analyzer, light will be transmitted or not. In an optical phase retardation device that has variable birefringence, such as those disclosed in U.S. Pat. Nos. 4,385,806, 4,540,243, and RE.32,521 (sometimes referred to as surface mode liquid crystal cells), depending on the optical phase retardation provided by the liquid crystal cell, plane polarized light may be rotated, and the optical output can be determined as a function of the direction of the plane of polarization. In a CRT light emission or not and brightness may be determined by electrons incident on a phosphor at a pixel. In electroluminescent displays and plasma displays light output may be determined by electrical input at respective areas on pixels.

The interlacing of raster lines or display lines is a known practice used in television and in other types of display systems. For example, in NTSC and PAL television type cathode ray tube (CRT) displays it is known that two interlaced fields of horizontal lines are used to provide an entire image frame. First one raster or set of lines is scanned to cause one subframe (sometimes referred to as sub-field) to be displayed; and then a second raster or set of lines is scanned to cause a second subframe to be displayed. The electrical signals used to scan one line in one subframe and the electrical signals used to scan the relatively adjacent line of the subsequent subframe may be different, and, therefore, the optical outputs of those lines may be different. The two raster subframes are presented sufficiently fast that the eye of an observer usually cannot distinguish between the respective images of the two successive subframes but rather integrates the two subframes to see a composite image. The two subframes are created sequentially by "writing" the image to respective pixels formed by phosphors to which an electron beam may be directed in response to electrical signals which control the electron beam in on-off and/or intensity manner. After the electron beam has reached the end of its scanning to create one subframe, e.g., the last pixel or phosphor dot area of that field, there is a period of time while the electron beam is moved or directed to the first pixel of the next subframe. During that period of time a blanking pulse is provided to prevent electrons from being directed to phosphors or pixels causing undesired light emission. Sometimes various circuits of a television or CRT display are synchronized to the operative timing of the television, CRT, etc. by synchronization with such blanking pulses.

The density of pixels, e.g., number of pixels per unit area, in a CRT display usually is, in a sense, an analog function depending on characteristics of the electron beam, drive and control circuitry for the beam, phosphor dot layout, shadow mask(s), etc., as is known. Usually a CRT is driven using the interlaced lines forming the subframes mentioned above. In an LCD, though, there is a fixed number of pixels per line or row; and data, e.g., whether a given pixel in a row is to transmit light or to block light transmission, usually is written to the pixels a row at a time. The data is written to one row, then to the next, and so on, and there usually is no interlacing of rows or of subframes as there is in CRT driving techniques.

In some LCD's the two subframes mentioned above usually are effectively averaged together, when driven by a CRT type of interlaced signal, since there usually is no interlacing of respective subframes. The electrical signals for driving adjacent scan lines of different respective interlaced subframes of a CRT display, both usually are delivered to only a single row of pixels in an LCD. Each pixel responds to the electrical signal applied thereto to transmit or to block light, for example. Those two sets of electrical signals are applied to the row of pixels at different times. Therefore, at one time a given row of LCD pixels may present as an optical output optical information from one subframe and at a later time present optical information from the other subframe.

Since the optical information presented in one subframe is expected to be displaced in space from the optical information presented in the other subframe to obtain the interlacing pattern of a CRT display, careful examination of the optical output from the above-mentioned LCD will show an amount of "jittering" of the image. This jittering is caused by the pixels of one row periodically being changed so the optical output thereof sequentially displays the result of energization by signals representing one scan line of information from one subframe and then energization by electrical signals representing the adjacent scan line of information from the next subframe.

This jittering can degrade the displayed image and can make viewing uncomfortable. Also, the problems, such as viewing discomfort and/or image degrading, caused by jittering tend to increase as the image is enlarged or magnified, e.g., when the image is created by a relatively miniature image source, such as the SONY display mentioned above, and is magnified for direct viewing or for projection by a projector.

One technique for reducing the jittering is to use relatively slow liquid crystal display devices. Therefore, the liquid crystal display element or pixel tends to average the electrical signals applied thereto. A disadvantage to this technique, though, is that image resolution is reduced because the information representing two scan lines is combined into a single line. Also, a slow acting liquid crystal display element tends to have undesirable hysteresis that slows motion being shown by the display.

There is a continuing need and/or desire to improve resolution of displays. It also would be desirable to facilitate the placing of circuitry in a display while minimizing the optical dead space caused by the circuitry. There also is a need to reduce jitter.

SUMMARY

With the foregoing in mind, then, one aspect of the invention is to increase the resolution of a display by electro-optically dithering an optical signal.

Another aspect relates to use of electro-optical dithering to obtain three dimensional images, especially using auto-stereoscopic effect.

Another aspect relates to using electro-optical dithering to effect beam switching of optical signals.

Another aspect is electro-optically to change selectively the location at which an optical output signal is presented to another location. A further aspect is to effect such change in more than one direction, e.g., along more then one axis.

According to another aspect, a device for changing or determining the location of an optical signal includes birefringent means for selectively refracting light based on optical polarization characteristic of the light, and means for changing such optical polarization characteristic of light, the birefringent means and the changing means being cooperative selectively to change the location of the optical signal.

According to another aspect, a system for increasing the resolution of an optical display having a plurality of picture elements includes birefringent means for selectively refracting light based on polarization characteristics of the light, changing means for selectively changing the polarization characteristics of light, and the birefringent means and the changing means being in optical series and cooperative in response to selective operation of the changing means to change the location of output optical signals therefrom.

According to another aspect, a display system includes a display for producing visual output information by selective operation of a plurality of picture elements at respective locations, and means for changing the location of the output information as a function of optical polarization thereby effectively to increase the number of picture elements.

According to another aspect, a display system includes a display for producing visual output information by selective operation of a plurality of picture elements at respective locations, and means for changing the location of the output information without physical realignment of a mechanical device thereby effectively to increase the number of picture elements.

According to another aspect, a display system includes a display for producing visual output information by selective operation of a plurality of picture elements at respective locations, and means for electro-optically changing the location of the output information thereby effectively to increase the number of picture elements.

According to another aspect, a method for displaying visual information includes presenting a first optical output from a source by providing plural optical signals arranged in a pattern, presenting a second optical output from the source by providing plural optical signals arranged in a pattern, and selectively shifting the location of the pattern of the second optical output relative to the location of the patten of the first optical output based on optical polarization.

According to another aspect, an electro-optical dithering system for shifting polarized light includes birefringent means for selectively refracting light as a function of a polarization characteristic of the light, and changing means for changing the polarization characteristic of polarized light to provide output light that is shifted or not as a function of optical polarization.

According to another aspect, a method of making a display includes positioning in optical series an image source, a birefringent means for selectively refracting light based on optical polarization characteristic of the light, and a changing means for changing such optical polarization characteristic.

Using principles of the invention, the location of an optical signal can be changed, and the change can be used for a number of purposes. For example, the change can be used to improve resolution of a display, to provide an auto-stereoscopic output, to interlace optical signals, to facilitate positioning and hiding of circuitry used in a display, to facilitate overlapping of tiles or pixels in a display, etc. A number of these examples are presented below. The invention may be used to achieve one or more of those and other uses.

An aspect of the invention relates to an optical line increaser, wherein the number of pixels in a optical display can be increased by electro-optical means.

An aspect of the invention relates to an optical line increaser, wherein the number of pixels in a optical display can be increased by electro-optical means, for example, to double, triple, quadruple, or otherwise to increase the effective number of pixels presenting output optical information for viewing by a person, machine, other device, etc., and/or for other use.

Another aspect is to hide or to reduce optical dead space in a display.

Another aspect is to use a switchable electro-optical device to effect dithering (changing effective location) of an optical signal.

Another aspect is to reduce jitter in an optical display.

Another aspect is to drive a non-interlaced display using an interlaced signal and electro-optically dithering the optical output of the display to reduce jitter.

Another aspect is to increase the effective number of pixels and/or lines of an optical display.

In accordance with a further aspect of the invention, a passive dithering display system includes an optical display including a plurality of pixels with optical dead space between the pixels for producing an image, and a birefringent material for shifting one polarization component of the image relative to a second polarization component of the image such that the shifted polarization component lies in the dead space.

In accordance with another aspect, a display system includes an optical display for producing an image and a first birefringent material for refracting one component of the image relative to a second component of the image based on polarization characteristics of the components to produce a plurality of adjacent images.

In accordance with a still further aspect of the invention, a method of reducing optical background noise includes the steps of displaying a plurality of pixels with optical dead space between said pixels for producing an image and shifting one polarization component of the image relative to a second polarization component of the image such that the shifted polarization component lies in the dead space.

One or more of these and other objects, features and advantages of the present invention are accomplished using the invention described and claimed below.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

BRIEF DESCRIPTION OF THE DRAWINGS

In the annexed drawings:

FIG. 1 is a schematic side elevation view of a CRT display including an electro-optical dithering system according to the present invention;

FIG. 2 is a schematic illustration of the components of the electro-optical dithering system of FIG. 1;

FIG. 3 is a schematic illustration of the double refraction effect through a calcite crystal which may be used in the electro-optical dithering system of the invention;

FIGS. 4A, 4B and 4C are, respectively, schematic illustrations indicating exemplary axial alignment of the several components of the electro-optical dithering system shown in FIG. 2;

FIG. 8 is a schematic side elevation view of the electro-optical dithering system of the invention used in an auto-stereoscopic display;

FIG. 9 is an enlarged view of a single lens element of the auto-stereoscopic display of FIG. 8;

FIG. 10 is a schematic plan view of part of a liquid crystal display showing areas where pixels are located and areas where there is circuity or dead space located between adjacent pixels and including the electro-optical dithering system of the invention;

FIG. 11 is a schematic section elevation view of the display of FIG. 10 showing the paths of optical signals that are shifted in location according to the on or off state of the electro-optical dithering system of the display;

FIGS. 14 and 15A–15E are schematic illustrations of a display system and parts thereof with a double electro-optical dithering system;

FIGS. 16A–16D are schematic illustrations of a pixel pattern that is dithered or not in up to four different spatial pattern locations;

FIG. 25 is a schematic illustration of the orientations of the optic axes of the components of the passive dithering system of FIG. 23;

FIG. 26 is a schematic illustration of the passive dithering system of FIG. 23 used in connection with a display which produces a nonpolarized light output;

FIG. 27 is a schematic illustration of the orientations of the optic axes of the components of the passive dithering system of FIG. 26;

FIG. 28 is a schematic illustration of an alternate embodiemnt of a passive dithering system;

FIG. 29 is a schematic illustration of the orientations of the optic axes of the components of the passive dithering system of FIG. 28; and FIG. 30 is a schematic illustration of the passive dithering system of FIG. 28 used in connection with a display which produces a nonpolarized light output.

DESCRIPTION

Figure 5A:
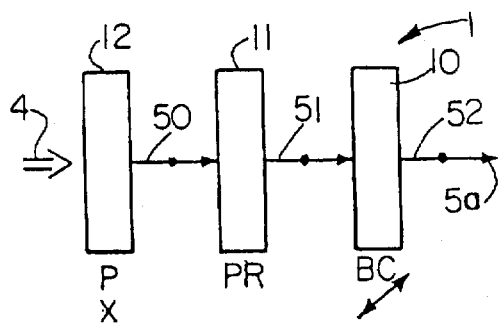
FIGS. 5A, 5B and 5C are, respectively, schematic illustrations similar to FIG. 2 showing the operation of the electro-optical dithering system on light in respective operational modes.

Referring, now in detail to the drawings wherein like reference numerals designate like parts in the several figures and initially to FIG. 1, an electro-optical dithering system in accordance with the present invention is generally indicated at 1 in use with a display 2 to form an optical display system 3 for providing optical signals, visual information, etc., as the output therefrom. The display 2 provides a source of light or optical signals, and such light is transmitted through the electro-optical dithering system to provide optical signals at respective locations for viewing or the like. Exemplary light is represented by an arrow 4, such as an optical signal produced at a particular location by the display 2 or produced by some other source and modulated by the display 2 as the output therefrom.

The location of the output optical signal 5 is represented by arrows 5a, 5b. Those arrows 5a, 5b represent the location of the output optical signal 5 resulting from the optical signal 4 being transmitted through the electro-optical dithering system 1 while the electro-optical dithering system is in a respective one or the other of the operative states thereof, such as off or on.

In the embodiment illustrated in FIG. 1 the display 2 is a CRT. It will be appreciated that the display 2 may be an LCD or another display, such as an electroluminescent display, plasma display, flat panel display or other display.

Dithering may refer to the physical displacement of an image. An electro-optical dithering system (EDS) refers to an electro-optical means to physically shift or to change the location of an optical signal, such as an image. The image may be shifted along an axis from one location to another and then back to the first, e.g. up and then down, left and then right, etc. The optical signal may be moved in another direction along a straight or other axis or not along an axis at all. The dithering may be repetitive or periodic or it may be asynchronous in moving an image from one location to another and then holding it there, at least for a set or non-predetermined time.

The electro-optical dithering system 1, as it is shown in FIG. 1, includes birefringent material, which sometimes is referred to as double refracting material, 10. An example of birefringent material is a calcite crystal material. Other double refracting (birefringent) materials also may be used. Birefringent material may transmit light straight through or may refract the light which is incident thereon, depending on a characteristic of the light incident thereon, such as optical polarization characteristic. In the illustrated embodiment the optical polarization characteristic is the direction of the electric vector of plane polarized light. Plane polarized light having one direction of electric vector (sometimes referred to as direction of the polarization axis, the transmission axis of the polarizer or of the light, the plane of polarization of the light, the direction of polarization, etc.) may transmit directly through the birefringent material 10 without being refracted or bent, whereas light having a different direction of plane of polarization may be refracted (bent) by the birefringent material 10. For example, plane polarized light which encounters one index of refraction characteristic, such as an ordinary index of refraction characteristic, of the birefringent material may be transmitted without refraction. However, plane polarized light which encounters a different index of refraction characteristic, such as the extraordinary index of refraction, of the birefringent material will bend or refract at the interface with the birefringent material, both upon entering and upon leaving the birefringent material. Therefore, in a sense the birefringent material 10 changes the direction of light transmitted through it, for example, as it changes the location of the output optical signal from location 5a to 5b.

In the optical display system 3 embodiment illustrated in FIG. 1 the electro-optical dithering system 1 also includes a switch 11 that can be operated to change the characteristic of light relevant to the birefringent material 10 to change the location of the output optical signal. In the exemplary embodiment of FIG. 1 refraction of light or transmission of light without refraction by the birefringent material 10 depends on the direction of polarization of plane polarized light incident on the birefringent material 10, and the switch 11 is able to switch the direction of polarization of such light incident on the birefringent material 10.

In the embodiment illustrated in FIG. 1 the, switch 11 is a liquid crystal cell or liquid crystal shutter type device which is able to transmit light to the birefringent material 10 such that the light incident on the birefringent material has a plane of polarization that can be changed by the switch. Accordingly, if the switch is in one operative state or mode, the light incident on the birefringent material 10 may have a plane of polarization such that the output optical signal 5 occurs at the location of the arrow 5a, and with the switch 11 in a different state of energization the plane of polarization of the light incident on the. birefringent material 10 can be changed (e.g., switched to an orthogonal direction to the first-mentioned plane) thereby to cause the output optical signal to occur at the location of the arrow 5b.

A linear polarizer (sometimes referred to as a plane polarizer) 12 is between the switch 11 and the CRT display 2. The light 4 provided by the display 2 is plane polarized by the polarizer 12. The direction of polarization in cooperation with one condition of the switch 11 will result in the light being transmitted directly through the birefringent material 10 without refraction so as to appear at location of arrow 5a. However, in response to the other condition of the switch 11, the light will be refracted by the birefringent material 10 so as to occur at the location of the arrow 5b.

With the foregoing in mind, then, it will be appreciated that the invention includes a material that can move the location of an output optical signal relative to the location of an incident (input optical signal depending on a characteristic of the incident optical signal, such as the direction of plane polarized light. The electro-optical dithering system 1 of the invention includes birefringent, double refracting, or equivalent material and a means to switch or to discriminate the characteristic of the incident optical signal.

In the embodiment illustrated in FIG. 1, the light 4 from a CRT is unpolarized. The polarizer 12 gives the light a characteristic of linear (plane) polarization. The switch 11 can change the direction of polarization, e.g., the direction of the electric vector of the polarized light. The birefringent material provides the output optical signal at the location 5a, 5b, depending on the characteristic of the light incident on the birefringent material.

The switch 11 may be a liquid crystal cell or several liquid crystal cells, such as twisted nematic liquid crystal cells, birefringent liquid crystal cells, such as those disclosed in U.S. Pat. Nos. 4,385,806, RE.32,521, and 4,540,243, the entire disclosures of which hereby are incorporated by reference. If desired, the liquid crystal cells may be arranged in optical series and operated as a push-pull arrangement to improve linearity of response, and/or for other purposes, for example, as is disclosed in one or more of the aforementioned patents. Other types of liquid crystal cells also may be used for the switch 11. Further, other types of devices that are able to switch the optical characteristic of light, such as the direction of plane polarization, etc., may be used for the switch 11; several examples include ferro-electric liquid crystal cells, variable optical retarders, PLZT devices, and so on.

An advantage to using a liquid crystal display (LCD) as the display 2 with the dithering system 1 is that the output light from an LCD usually already may have a characteristic of optical polarization, such as linear polarization. In such a case, the linear polarization characteristic provided by such displays may eliminate the need for a separate linear polarizer 12.

In FIG. 2 the electro-optical dithering system 1 is shown in use in an optical display system 13 having a transmissive LCD 20. The LCD 20 may be a twisted nematic liquid crystal display, birefringent liquid crystal display, or some other type of liquid crystal display which produces in response to input light 21 from a light source 22, output light represented by an arrow 23. The LCD 20 may be transmissive or reflective. The output light 23 may be, for example, a graphic image, one or more light beams that are selectively turned on or off depending on operation of the liquid crystal display 20, etc. The graphic image may be a moving image, an alphanumeric display, etc. The dithering system 1 includes a birefringent material 10 and a switch 11. To simplify the following description, the switch 11 may be referred to as a polarization rotator, which rotates the plane of polarization of the light represented by arrow 23 an mount depending upon the energization state or condition of the polarization rotator. For example, if the switch 11 were a twisted nematic liquid crystal cell, when it is de-energized, it would rotate the plane of polarization by 90 degrees (or some other amount depending on the nature of the liquid crystal cell), and when the twisted nematic liquid crystal cell is in a fully energized condition, it would not rotate the plane of polarization of the light incident thereon. Similar operation could be obtained by using birefringent liquid crystal cells. Additionally, if desired, compensation may be provided for residual retardation in a liquid crystal cell, whether of the birefringent or twisted nematic type; such compensation may be provided by a wave plate or the like, such as a quarter wave plate positioned in a particular orientation relative to the rub direction or axis of the liquid crystal cell used in the switch 11.

Further, a wave plate, such as a half wave plate, may be used to rotate the plane of polarization of light 23 so it is appropriately aligned with the optic axis (sometimes referred to herein as the rub direction, optical axis, or simply axis) of the switch 11. For example, if the switch 11 were a twisted nematic liquid crystal cell, the plane of polarization of the light 23 may be parallel or perpendicular to the rub direction of one of the plates of the liquid crystal cell. If the switch 11 were a birefringent liquid crystal cell, such as a surface mode cell or a pi-cell (e.g., as in U.S. Pat. No. 4,582,396, which is hereby incorporated by reference), the plane of polarization of light 23 may be at 45 degrees to the rub direction. In using a half wave plate to adjust plane of polarization, for example, the axis of the half wave plate would be aligned to one half the angular distance between the orientation of the plane of polarization of the light incident on the half wave plate and the angular orientation desired for the light output from the half wave plate.

Turning to FIG. 3, there is shown an example of birefringent material 10 in the form of the mineral calcite, also referred to as a calcite crystal 30. Unpolarized light 31 enters the calcite 30 at the left hand face 32 thereof. The light enters at a right angle to the face 32. The light 31 is resolved into two orthogonally polarized components 33, 34 in view of the birefringent nature of the calcite. The optical axis of the light components 33, 34 are oriented such that one component 33 has a plane of polarization or electric vector direction into and out of the plane of the drawing of FIG. 3, as is represented by the dots shown in FIG. 3, and such light 33 experiences an index of refraction change between the environment 35 outside the calcite 30 and the environment 36 inside the calcite 30. However, the axis of the calcite crystal 30 is at a right angle to the plane of polarization to the light 33, and, therefore, this components of light 33 travels through the calcite crystal 30 without deflection (refraction); sometimes this light is referred to herein as the undithered light.

The light component 34 is polarized vertically in the plane of the drawing of FIG. 3 and is represented by a double-headed arrow in the drawing. The light component 34 experiences a change in index of refraction as above; however, the light component 34 also encounters the calcite crystal axis at an angle which is other than a right angle. Therefore, the light component 34 is refracted and its path is deflected (direction is changed) as it enters and leaves the crystal on its travel through the crystal 30, as is shown in FIG. 3; sometimes this light is referred to herein as the dithered light. This property of refraction of one polarization component and no refraction of the other polarization component of light incident on a birefringent material sometimes is called double refraction, and it occurs in many materials. The amount of physical displacement between the light components 33, 34 where they exit the right hand face 37 of the calcite crystal 30 and become, respectively, output light 33a, 34a represented by arrows at locations 38a, 38b, respectively, depends on the thickness of the calcite crystal, indices of refraction of the calcite crystal and the external environment thereof, and the orientation of the optical axis of the specific material, as is known.

In the optical display system 3 of FIG. 1 in which the display 2 is a CRT and in the optical display system 13 of FIG. 2 which uses an LCD 20 the direction of polarization of light incident on the switch 11 and the orientation of the switch 11 may be related for optimal operation. In one example of the invention, the switch 11 is a birefringent liquid crystal cell (or a pair of them operating in push-pull manner), and such liquid crystal cell(s) has (have) an axis which sometimes is referred to as the rub direction, alignment direction, optic or optical axis, etc. of the liquid crystal cell. Using such a liquid crystal cell in the systems 3 or 13, for optimal operation the polarization direction (transmission direction axis of the polarizer 12 or of the LCD 20, for example) should be at 45 degrees relative to the axis of the switch 11. Additionally, preferably the projection of the axis of the calcite crystal 30 is oriented at 45 degrees to the axis of the switch 11. These relationships are depicted in FIGS. 4A, 4B and 4C.

Briefly referring to FIGS. 4A, 4B and 4C, the above-described relationships of axes is shown. In FIG. 4A the transmission axis of the polarizer 12 or the plane of polarization of light delivered by the liquid crystal display 20 or by CRT 2 and polarizer 12 is shown as horizontal at 40. However, such direction also may be vertical, because it is desired that the relationship between that axis and the axis of the liquid crystal cell(s) of the birefringent liquid crystal cell switch 11 be at a relative 45 degrees thereto. Such 45 degrees relationship is shown by the respective axes 41, 42 for the switch 11. In fact, such axes 41, 42 may represent the axis of one liquid crystal cell and the axis of a second liquid crystal cell, the two being arranged in optical series and being operated in push-pull fashion. The axes 43, 44 of the calcite crystal 30 are shown as horizontal and vertical. However, the vertical axis actually is tipped in or out of the plane of the drawing and it actually is the projections of those axes 43, 44 which would appear as horizontal or vertical. In other words, such projections of the axes preferably are at 45 degrees to the axes 41, 42 of the switch 11. The described relative orientation of the axes of the various components used in connection with the invention is exemplary, and it will be appreciated that other arrangements may be used to obtain a particular type of operation. However, in the ideal simplified case described herein, the relationship described may be employed. Also, it will be appreciated that compensation may be provided to adjust the effective orientation of a particular axis. Such compensation can be provided using a birefringent material, a wave plate, such as a quarter wave plate or another one, etc., as was mentioned above.

It will be appreciated that whether the axis of a birefringent switch 11 is at plus or minus 45 degrees, represented by the axis lines 41, 42, for example, and whether a respective axis 43, 44 of the calcite 30 or other double refracting material 10 is at plus or minus 45 degrees to the axis of the birefringent switch (and parallel or perpendicular to the plane of polarization 40) will determine whether the dithered optical signal will be moved up, down, left or right relative to the undithered signal. If the switch 11 were a twisted nematic liquid crystal cell, the axis 40 may be parallel or perpendicular to one of the axes of the liquid crystal cell, and the orientation of the calcite 30 may be as shown in FIG. 4C relative to the plane of polarization of the light represented at 40 in FIG. 4A.

It will be appreciated that the arrangement of axes herein described are exemplary. The alignment of the switch 11, whatever that component is comprised of, preferably is such that the switch is able to change a characteristic of light in the display system 3, 13 (and others described herein, for example) so that selective dithering can be carried out by a double refraction or other functionally equivalent material or device. Orientation of the double refracting material may be such as to cause such selective dithering depending on an optical characteristic of the light, which is incident thereon and/or is transmitted therethrough, relative to the double refracting material.

Quarter wave plates, other wave plates, etc. may be used in conjunction with coupling of light along optical paths used in the electro-optical dithering system 1 and/or the optical display systems 3 or 19, etc. Also, such wave plates may be used to convert plane polarized light to circularly polarize light or vice versa, depending on the nature of the optical coupling occurring in the various components and optical paths and/or the switch 11 used in the invention.

Figure 5B:
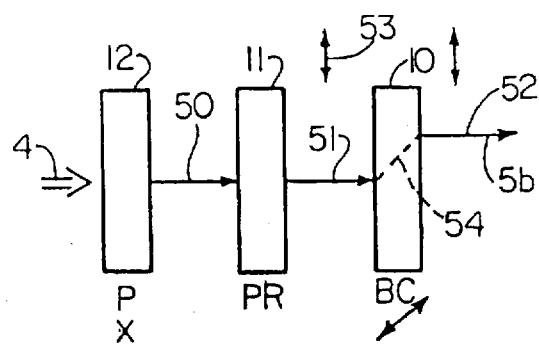
Figure 5C:
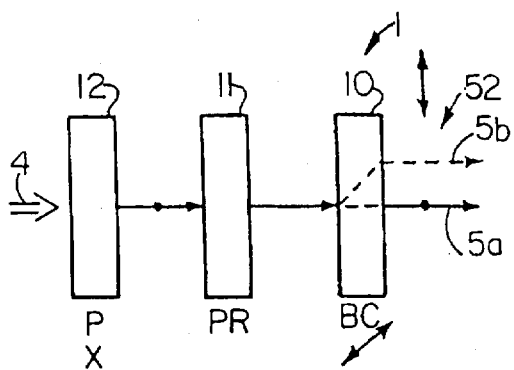

Referring to FIGS. 5A, 5B and 5C, operation of the EDS 1 according to the invention is depicted for use in the exemplary systems 1, 13, etc., which are expressly described herein and in other display systems, too. Light 4, for example, from a CRT, is horizontally polarized by the polarizer 12. Arrow 50 represents such horizonal polarization, as does the dot in that arrow 50. The switch 11 is a birefringent liquid crystal cell of the type disclosed in the above-mentioned patents (such types sometimes being referred to as "surface mode" or "pi-cell" liquid crystal devices). When the switch 11 is in the high voltage state it does not affect the state of polarization of the light 50. Therefore, light 51 exiting the switch 11 also has horizontal polarization, e.g., into and out of the plane of the paper of the drawing. The light 51 enters the double refracting material (birefringent material) 10 and is transmitted without any deflection and is provided as output light 52 at the location and in the direction of arrow 5a.

Referring to FIG. 5B, when the switch 11 is in the low voltage state, it rotates the plane of polarization of the light 50 preferably 90 degrees, i.e., into the vertical plane, as is shown by the vertical arrow 53 associated with the light 51. The vertically polarized light enters the double refracting material 10 and its path is physically displaced, as is represented by dashed line 54 resulting in output light 52 at the location and in the direction of the arrow 5b.

Briefly referring to FIG. 5C, the electro-optical dithering system 1 is shown having the light output 52 selectively switched between the location of the arrows 5a when the switch 11 is in the high voltage (no rotation of plane of polarization) state and the location of the arrow 5b, which occurs when the switch 11 is in the low voltage (polarization rotating) state. The light represented by arrow 5a is horizontally polarized, and the light represented by the arrow 5b is vertically polarized, as is represented in the drawing of FIG. 5C. By selectively energizing and de-energizing or, in any event, operating the switch 11 between two mentioned voltage states, which switch the polarization characteristic of the light, the location of the output optical signal 52 can be switched between the locations represented by arrows 5a and 5b.

Figure 6:
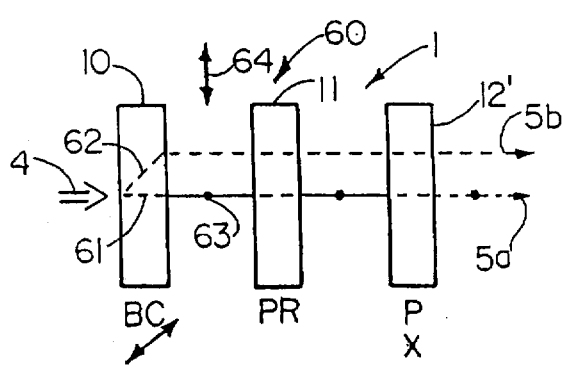
FIG. 6 is a schematic illustration of an alternate embodiment of electro-optical dithering system.

A modified optical display system 60 is shown in FIG. 6 using an electro-optical dithering system 1, as was described above, in combination with an output polarizer (analyzer) 12'. The analyzer 12' may be a linear (plane) polarizer or some other device which can discriminate between the characteristics of light incident therein, such as the direction of plane of polarization, circular polarization, etc. The parts of the electro-optical dithering system 1 include a birefringent material 10, such as a calcite material described above, and a switch 11, such as one of the liquid crystal cell devices described above, or some other device, as will be appreciated.

The incident light 4 is received from a light source or image source, such as a CRT 2 or some other device that delivers unpolarized light output. Such unpolarized light 4 incident on the birefringent material 10 is divided into two components 61, 62. The light component 61 is horizontally polarized and it is transmitted directly through the birefringent material 10 without deflection or refraction. The light component 62 is polarized in the vertical direction, and it is refracted so that its direction is changed (path is deflected) in the manner shown representatively in FIG. 6.

It will be appreciated that here and elsewhere in this description reference to directions is meant to be relative and exemplary; for example, horizontal and vertical are meant to indicate orthogonal relationship. Directions are exemplary and are used to facilitate description and understanding of the invention.

The horizontally polarized light component 61 and the vertically polarized light component 62, the directions of polarization being represented by the dots 63 and the arrow 64, respectively, are incident on the switch 11. From the switch 11 the light components 61, 62 are incident on the analyzer 12'. That light component which has a polarization direction that is parallel to the transmission axis of the analyzer 12' will be transmitted through the analyzer, and the other light component will be blocked. Depending on whether the switch 11 is in the operative state to transmit light without rotation of the plane of polarization or is in the operative mode to rotate the plane of polarization of the light transmitted therethrough, one or the other of the light components 61, 62 will be transmitted through the analyzer 12' at a respective location represented by one of the arrows 5a, 5b.

Figure 7:
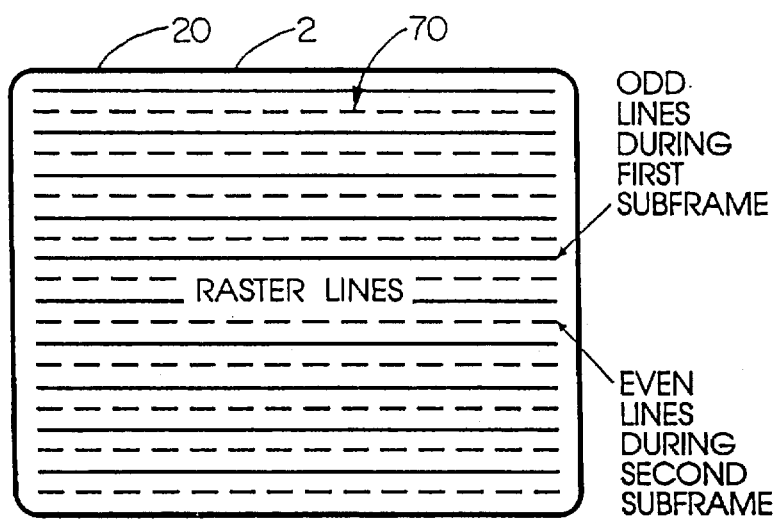
FIG. 7 is a schematic front view of the face or display output of a CRT showing exemplary raster lines.

An exemplary use of the invention is illustrated in FIG. 7 for the CRT display 2 or for a liquid crystal display 20, for example. The display 2, 20 has a resolution of some fixed number of raster lines or rows of pixels that are updated periodically, for example, 60 times per second.

Assume that the speed of the display is increased, for example, is doubled to 120 times per second to re-scan the raster lines and/or the rows of pixels. The switch 11 can be synchronized with the switching of the display (CRT 2 or liquid crystal display 20) such that the raster images, for example, are alternately displaced and not displaced, e.g., to locations 5a and 5b, respectively. Such synchronization may be with respect to the blanking pulse or some other signal.

The amount of such shifting or displacement can be adjusted as aforesaid so that the displaced raster lines (or pixel rows) interdigitate the non-displaced raster lines (pixel rows). The information on the displaced and non-displaced rasters (pixel rows) are selected to carry complementary information; and, therefore, the resolution of the entire image displayed by the optical display system 3 or 13 is increased by a factor of 2. The same technique can be used to provide image coverage over the dead space between adjacent pixels in a liquid crystal display (or in a CRT, e.g., where a shadow mask blocks transmission of electrons) or to cover areas where conductors or other electrical connections or components of a liquid crystal display, such as parts of an active matrix array, are located, usually between adjacent pixels.

The display ordinarily would be refreshed or updated 60 times per second to cover both the odd and even raster lines. However, by increasing the refresh or update rate to 120 times per second and using the electro-optical dithering system to shift the location of the output image or optical signal for part of the time, essentially the odd and even raster lines, while unshifted, can be refreshed or updated 60 times per second and the odd and even raster lines, while shifted, can be refreshed or updated 60 times per second. The update or refresh times or rates presented here are exemplary; others may be used.

In FIG. 7, assuming the display 2 is a CRT, the front face 70 has a plurality of odd raster lines and a plurality of even raster lines. During operation of the CRT display 2, initially the odd raster lines are scanned to produce a first subframe. Subsequently, the even raster lines are scanned, and a second subframe is produced. The information produced during the respective first and second subframes is referred to as complementary and together complete an image that is viewed. The time between producing one subframe and the next is sufficiently fast that the eye of an observer (viewer) integrates the respective first and second subframe images to see one complete (composite) image. Similarly, using the principles of the present invention, the space between adjacent raster lines can in effect be scanned to produce additional complementary image information. Thus, for example, the odd lines can be scanned during the first subframe; the even lines can be scanned during the second subframe; the odd lines can be scanned during a third subframe but during which the switch 11 of the electro-optical dithering system 1 is operative to cause shifting of the image to the space between respective adjacent pairs of odd and even raster lines; and finally during a fourth subframe analogous to the third, the even raster lines can be scanned while the electro-optical dithering system provides a shift of optical output, to produce the shifted image between respective pairs of odd and even raster lines. In this way resolution of the output image produced by the optical display system 3 is increased without having to increase the resolution or space between relatively adjacent raster lines (scan lines) of the CRT display 2 and a similar technique can be used to increase the effective number of the pixels, pixel rows, etc. to increase resolution of the liquid crystal display 20.

Turning to FIGS. 8 and 9, an auto-stereoscopic display system 80 is shown using the electro-optical dithering system 1 of the invention. The principles of auto-stereoscopic display are well known and will not be described in detail here. However, the technique of obtaining the auto-stereoscopic display effect will be described.

In the auto-stereoscopic display 80, there is a CRT display 2, which provides a light output 4, which is delivered to a linear polarizer 12. The plane polarized light from the linear polarizer 12 is provided to the electro-optical dithering system 1, which includes a surface mode device (surface mode liquid crystal cell) switch 11 and double refracting material (birefringent material) 10. At the output of the electro-optical dithering system 11 is a cylindrical lens array 81. The cylindrical lens array includes a plurality of cylindrical lenses located in an appropriate arrangement or pattern, as is known, to direct light to or toward respective eyes 82, 83 of a person, or to some other device able to detect or "see" the light received thereby. By providing a left eye image to the left eye 82 and a right eye image to the right eye 83, an individual viewing the auto-stereoscopic display system 80 will discern a three dimensional or stereoscopic effect.

Using the electro-optical dithering system 1 of the invention in combination with a display source, such as a CRT display 2, a liquid crystal display 20, or some other display, light beam steering can be accomplished to obtain the left eye and right eye images. Therefore, auto-stereoscopic display systems can be provided easily and relatively inexpensively.

In FIG. 9 the technique for obtaining beam steering for auto-stereoscopic effect is illustrated. Incident light 4, which is unpolarized, as is represented by the arrows and dots on the light is incident on the plane polarizer 12. Alternatively, plane polarized light can be provided from an image source or light source, such as a liquid crystal display (and polarizer 12 may be eliminated). In any event, the light which exits the polarizer 12 is plane polarized, for example, in a horizontal plane, as is illustrated in FIG. 9. Such light then enters the switch 11 and from there the light enters and transmits through the double refracting material 10. Depending on whether the switch 11 rotates the plane of polarization or it does not rotate the plane of polarization of the light transmitted therethrough, the double refracting material 10 will deflect or will not deflect the light transmitted therethrough. In the case that the switch 11 does not rotate the plane of polarization, and the above-described alignment of the double refracting material 10 is provided, the light will transmit directly through the material 10 without deflection as light ray 90. When light ray 90 is transmitted through the interface 91 between the cylindrical lens 92 of the cylindrical lens array 81 and the external environment, such as air, represented at 93, the light 90 will refract in the direction of the arrow 94 toward the left eye 82 of the observer (viewer). The light 90 traveling in the direction of the arrow 94 remains polarized in the so-called horizontal direction, i.e., into and out of the plane of the paper of the drawing.

However, when the switch 11 rotates the plane of polarization of light transmitted therethrough, the double refracting material 10 deflects the light, as was described above, resulting in the light 95, which travels to a different location of the interface 91 of the lens 92. The light 95 refracts at the interface 91 and is bent or deflected in the direction of the arrow 96 toward the right eye 83 of the observer. The light 95 is vertically polarized, i.e., the plane of polarization is parallel with the plane of the paper of the drawing of FIG. 9.

In operation of the auto-stereoscopic display 80, left eye and right eye images sequentially are produced by the display 2 (20) for example. When the left eye image is displayed, the switch 11 does not rotate the plane of polarization, and the light 90 follows the direction of the arrow 94 to the left eye 82 of the observer. When the right eye image is produced by the display, the switch 11 does rotate the plane of polarization so that the material 10 deflects the light as light 95 which is refracted to the direction of the arrow 96 to the right eye 83 of the observer. For convenience of this description, it is understood that the indices of refraction of the material 10 and the material of which the lens 92 is made would be the same or about the same to avoid further refraction at the interface therebetween; however, if there is refraction there, such refraction can be taken into account, as will be appreciated by those having ordinary skill in the art.

Referring to FIGS. 10 and 11, a display system 99, which includes a liquid crystal display 100, is shown in plan and section views. The display system 99 is similar to the several other display systems described herein, such as those designated 1, 13, etc. The LCD 100 has a plurality of pixels 101 arranged in respective rows 102 with dead space 103 between respective rows and also at the edge 104 of the display 100. As is seen in FIG. 11, the liquid crystal display 100 includes a substrate 105 on which an active matrix array 106 is located. The liquid crystal display also includes a further substrate 107, a space 108 between substrates where liquid crystal material 109 is located, a seal 110 to close the space between the substrates, and (not shown) appropriate driving circuitry, as is well known. Light 120 represented by respective arrows illustrated in FIG. 11 is provided by a light source 121 and is selectively transmitted or not through the liquid crystal display. The light 120 is plane polarized by a plane polarizer 122 located between the light source 121 and the liquid crystal display 100, and the light 120 is transmitted or is not transmitted as a function of the plane of polarization thereof relative to an analyzer 123, as is well known. An electrode 124 on the substrate 107 and respective transistors and electrodes of the active matrix array 106 on the substrate 105 apply or do not apply electric field to liquid crystal material 109 at respective pixels 101 to determine whether or not the plane of polarization of light 120 is rotated and, thus, whether such light will be transmitted or not through the analyzer 123.

The light 120 which is transmitted through the analyzer 123 is incident on the electro-optical dithering system (EDS)

1. The electro-optical dithering system may be operated to shift or not to shift the location of the light 120 to locations 5a, 5b in the manner described above. If the optical signal at locations 5a, 5b is complementary, as was described above, the resolution of the optical display system 99 shown in FIG. 11 can be increased. Moreover, as part of such increased resolution, the dead space 103 where transistors 131 and/or other components that are not light transmissive in the active matrix array 106 effectively are covered over by the shifted light 5b, for example. Therefore, using the electro-optical dithering system 1 in a display system 99 as described, the light blocking portions of the active matrix array, of conductors, etc., can be in effect overcome or negated while the overall resolution of the display is improved.

The parts shown in FIGS. 10 and 11 are in a relatively horizontal relation showing dithering in a vertical direction. It will be appreciated that dithering can alternatively be in a horizontal direction or, if desired, multiple electro-optical dithering systems 1 can be used in optical series in order to obtain both vertical dithering and horizontal dithering.

The LCD 100 preferably is relatively fast acting to turn on and off. Therefore, the combination of the fast acting LCD with the EDS 1 the respective lines of one subframe of information can be displayed by the respective rows of pixels of the LCD and subsequently the interlaced lines of the next subframe can be displayed by the same respective rows of pixels of the LCD.

The light source for the LCD 100 may be a pulsed source, which produces light output in pulses or sequential bursts. In such case, it is desirable to synchronize the light pulses or bursts of the light source with the LCD and/or with the EDS 1. Therefore, the respective pixels of the LCD would transmit or block light when the light source is producing a desired light output and the mount of time that the light source is transitioning between a light transmitting or light blocking state may be reduced and preferably is minimized. Also, the LCD would be operative to transmit or to block light when the light source is producing its intended light output rather than when the light source is not producing a burst of light or a desired light output. This tends to increase the contrast of the output image, since the shutter element (LCD 100) is not changing state when the light is pulsed, e.g. is changing its state from light producing to not producing or vice versa.

The EDS 1 and the LCD 100 preferably are synchronized. Therefore, when the LCD is producing scan lines of information from one subframe the EDS is in one state, and when the LCD is producing scan lines of information from the other subframe, the EDS is in its other state thereby causing the lines of one subframe to be interlaced with the lines of the other subframe. The EDS and a pulsating type light source also may be synchronized so that the EDS switches states during the time that no light output or non-optimal light output is produced by the light source. This further enhances contrast of the display system 3, 13, 99, 103.

Figure 12:
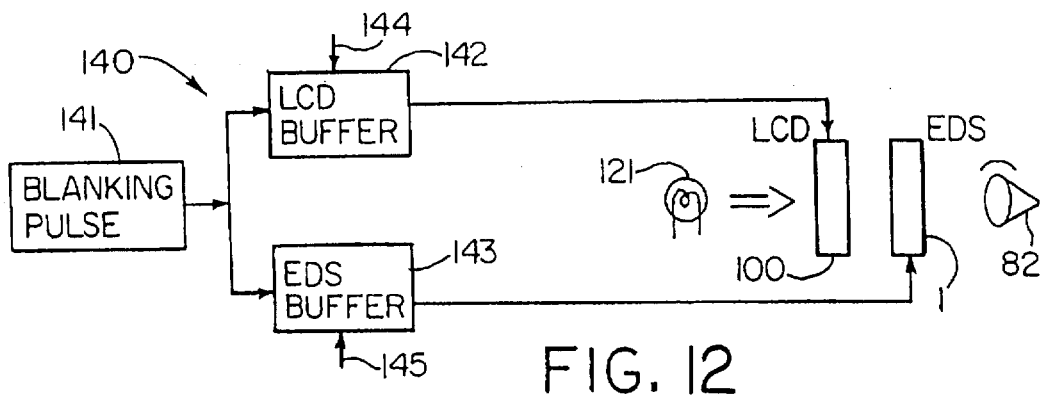
FIGS. 12 and 13 are schematic block diagrams of synchronizing circuit techniques useful in the various display systems of the invention.

Various circuitry may be used to obtain the aforementioned synchronization. Two examples are shown, respectively, in FIGS. 12 and 13. In FIG. 12 an exemplary display system 140 is shown. In the display system 140 a blanking pulse from a source 141 is supplied to respective LCD buffer and EDS buffer circuits 142, 143 to synchronize operation of them. The actual information signals from line 144 indicating the light transmitting or blocking state, for example, of the pixels of the LCD 100, for example, as is shown in FIGS. 10 and 11, are provided the LCD buffer 142. Those information signals are not delivered to the LCD 100, though, until appropriately coordinated or synchronized with the blanking pulses. The EDS 1 is connected to the EDS buffer 143 and receives its drive signal from line 145 to dither or not the optical output from the LCD 100. The EDS buffer also receives the blanking pulse from the source 141 to synchronize delivery of the signals to the EDS with such blanking pulses and/or with the operation of the LCD buffer and information signals delivered to the LCD. The buffers 142, 143 can be synchronized with respect to each other by appropriate timed operation thereof with respect to the blanking pulse; or, alternatively, the buffers can be directly coupled to each other to synchronize operation thereof so that the dithering function is coordinated with switching of pixels or writing of information to the LCD.

Figure 13:
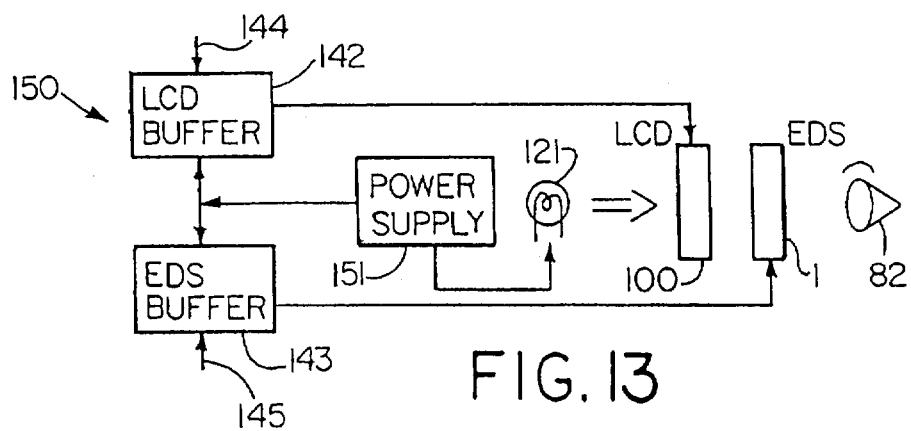
Figure 14:
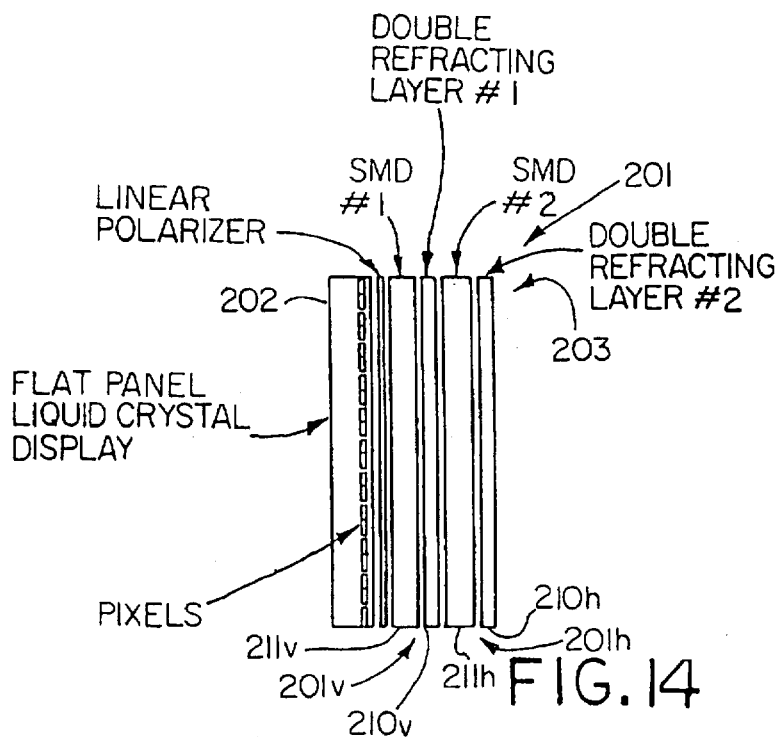

As another example of synchronization, FIG. 13 depicts a display system 150 in which a pulsed light source 121, for example, receives pulsed power from a power supply 151. A signal representing the characteristics of the pulsed power from the powers supply 151 is provided to the LCD buffer 142 and EDS buffer 143, which respectively receive information and power signals on lines 144, 145 as described above. By synchronizing the LCD 100 and EDS 1 with respect to each other and/or with respect to the pulsing light source, the LCD can switch states as new information is written thereto when the light source is not producing significant light output, and/or the EDS can switch from direct transmission to dithered transmission of light states when the light source is not producing a bright output and/or the LCD is not in the process of switching display states.

The foregoing are but two examples of synchronization useful in the invention. It will be appreciated by those having ordinary skill in the art that many other types of synchronizing techniques may be used to obtain the desired synchronization.

Although it may be desired to obtain full interlacing and separation of respective lines as in a CRT display, for example, even less than full interlacing, e.g., an amount of displacement that does not fully separate the lines but nevertheless reduces the amount of overlap thereof, will tend to reduce the above-mentioned jitter and improve the optical output of the LCD.

Interlacing or dithering can be used to effect vertical displacement (changing of location of the optical output signal), horizontal (lateral) displacement, and/or diagonal displacement of the optical signal, such as that produced as the output from a pixel of a display, e.g., a CRT, LCD, or any other type of display. The direction of displacement will depend on the orientation of the various components of the optical system. For example, in the EDS of FIG. 1 having orientation of axes of components shown in FIGS. 4A, 4B and 4C, vertical displacement will occur. However, by changing the relative orientation of the axes by 45 degrees or 90 degrees, the displacement as a function of the state of the switch 11, for example, can be changed to diagonal or horizontal.

Using the vertical displacement of optical signals by the EDS 1 in combination with a display, such as an LCD, for example, it possible in effect to double the resolution of the display in the manner described above. Thus, in a sense, the EDS becomes an optical line doubler which doubles the number of horizontal lines of resolution of the display system. However, by using both vertical and horizontal displacement functions in a display system, it is possible to obtain in effect up to quadruple the resolution of the display relative to operation of the display absent the EDS.

Referring to FIGS. 14 and 15A–15E an EDS system 201 used with a display 202, in the illustrated embodiment an LCD (although other types of displays can be used) is shown as a display system 203. In FIGS. 14 and 15A–15E reference numerals which designate parts that are the same or similar to those described above are the same as the reference numerals that designate such above-described parts except being increased by the value 200. Thus, display system 203 is similar to display systems 3, 13, 99, 103, etc. mentioned herein.

However, the EDS system 201 of display system 203 includes two EDS portions 201v and 201h, which respectively can be operated to obtain vertical and horizontal displacement of the optical signal transmitted therethrough. Each EDS 201v, 201h includes, respectively, a double refracting material 210v, 210h and a switch 211v, 211h. For example, each double refracting material may be a calcite crystal and each switch may be a surface mode (birefringent) liquid crystal cell. The source of optical signals in display system 203 is a flat panel liquid crystal display 202, although other types of displays may be used. The LCD 202 provides light output that is plane polarized, and, therefore, a separate polarizer like the polarizer 12 of FIG. 1, for example, may be unnecessary in the illustrated embodiment of display system 203. It will be appreciated that although the display system 203 uses two EDS devices or portions, the principles of the invention may be used with more than two EDS portions to obtain not only horizontal and vertical displacement but also displacement in even another direction.

The relative orientation of the axes of the respective components of the display system 203 is shown in FIGS. 15A–15E. Hane (linear) polarized light having a horizontal plane of polarization is provided by the LCD 202, as is seen in FIG. 15A. In the vertical displacement EDS 201v, the axis of the birefringent liquid crystal switch 211v shown in FIG. 15B is oriented at 45 degrees to the plane of polarization of light from the source 203; in the illustrated embodiment, such orientation is actually −45 degrees relative to vertical, for example. The projection of the axis of the double refracting material 210v is vertical, as is seen in FIG. 15C. In the horizontal displacement EDS 201h, the axis of the birefringent liquid crystal switch 211h is oriented at +45 degrees to the vertical (FIG. 15D), and the projection of the axis of the double refracting material 210h is horizontal (FIG. 15E). The actual alignments may be slightly different from those illustrated to accommodate or to compensate for residual birefringence in the liquid crystal switches and/or for other purposes. Also, if desired wave plates and/or other optical components may be included with one or more of the EDS devices 201v, 201h to compensate for such residual retardation and/or other factors.

The display system 203 can be operated in four different states. In one state shown in FIG. 16A with both EDS devices 201v, 201h of FIG. 14 not displacing light, the light from the display source 202 is transmitted without being displaced; this may occur with birefringent switches 211v, 211h being in high voltage, non-polarization rotating state and low, polarization rotating state, respectively. In a second state shown in FIG. 16B with EDS device 201v, 201h respectively displacing and not displacing light, the light from the display source 202 is transmitted while being horizontally, but not vertically displaced; this may occur with both birefringent switch 211v being in high voltage, non-polarization rotating state. In a third state shown in FIG. 16C with both EDS devices 201v, 201h displacing light, the light from the display source 202 is transmitted while being displaced both horizontally and vertically; this may occur with both birefringent switches 211v, 211h being in low voltage, polarization rotating state. In a fourth state shown in FIG. 16D with EDS device 201v, 201h respectively displacing and not displacing light, the light from the display source 202 is transmitted while being vertically, but not horizontally displaced; this may occur with EDS 211v in the low voltage, polarization rotating state and birefringent switch 211h being in high voltage, non-polarization rotating state.

Figure 17:
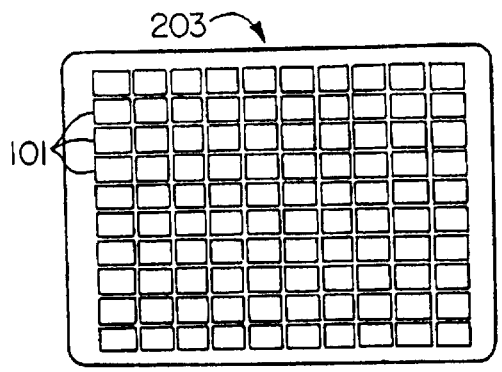
FIG. 17 is a composite of the pixel patterns of FIGS. 16A–16D.

In FIG. 17 is illustrated a composite of the display conditions depicted in FIGS. 16A through 16D. By using relatively fast acting LCD as the display source 202 and two EDS devices 201v, 201h synchronized and operated in the manner just described so that the pixels first are shown in the manner in FIG. 16A, then as in FIG. 16B, etc., sufficiently quickly that the observer's eyes tend to integrate the respective images, a high resolution image with a pixel density like that shown in FIG. 17 can be obtained. It will be appreciated that an exemplary optimum improvement in resolution using the display system 203 in the described manner can increase resolution of the display 202 by approximately a factor of 4.

Thus, it will be appreciated that the respective switches 211v, 211h may be operated according to the following table to obtain the above-described operation controllably to vertically shift or displace and/or to horizontally shift or displace the optical signals from the display 202. High means electrically operated so as to be not polarization rotating and low means electrically operated so as to be polarization rotating, although other conventions may be used.

TABLE 1

| Switch 211v | Switch 211h |
|---|---|
| High | Low |
| Low | High |
| High | Low |
| Low | High |

In the present invention the switches and double refracting material may be substantially optically transparent. Therefore, those components do not tend to absorb light. The use of such components in a display system 203, for example, does not ordinarily significantly reduce the brightness of the display output. Although two or more images are placed sequentially in the field of view provided by the display system 3, 13, 103, 203, etc., brightness of the display output is not diminished; rather, image resolution can be increased.

Other types of birefringent materials and/or devices may be used in place of or in addition to the calcite material double refracting device 10 described above. For example, other types of crystal materials and/or minerals may be used; the amount of displacement between an unrefracted optical signal and a refracted optical signal by such double refracting material would depend on index of refraction characteristics of the double refracting material, the index of refraction of the environment external of the double refracting material, wavelength of optical signal, and distance the optical signal travels in the double refracting material.

Another double refracting material which may be used in the invention as component 10, for example, is liquid crystal material. Liquid crystal material, such as nematic liquid crystal and smectic liquid crystal material may be birefringent and may be used. Other types of birefringent liquid crystal materials also may be used. By organizing or orienting the liquid crystal material in a particular organization or orientation, the transmission of light therethrough with or without refracting the light can be dependent on the direction of electric vector of the light, e.g., the plane of polarization of plane polarized light.

A polymer liquid crystal may be especially useful as such a double refracting material, for such material both can have a relatively large birefringence and also can be formed into a solid material which maintains the orientation of the structure of the liquid crystal material thereof. Polymer liquid crystal materials are known.

However, if the double refracting material were of a liquid crystal material whose structural orientation or organization could be switched, e.g., in response to application of a prescribed input such as an electric field (or removal of such field or changing voltage or some other characteristic of the field, etc.), then the function of the two components of an EDS may be replaced by a single switchable liquid crystal shutter type device. In this case the liquid crystal shutter could provide one index of refraction or birefringence characteristic to refract light transmitted therethrough a given amount and a different index of refraction characteristic with no birefringence so as not to refract such light or with parameters to refract the light a different amount.

Figure 18:
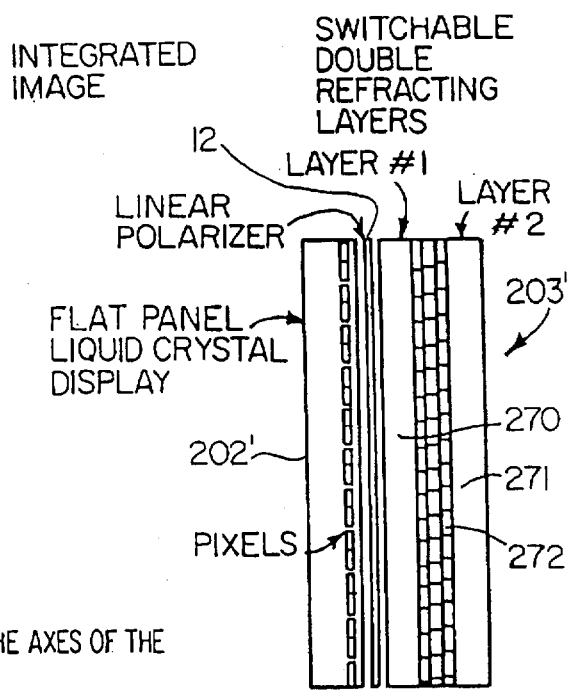
FIGS. 18 and 19 are schematic illustrations of a display system with a double electro-optical dithering system and parts thereof using switchable liquid crystal birefringent devices.
Figure 19:
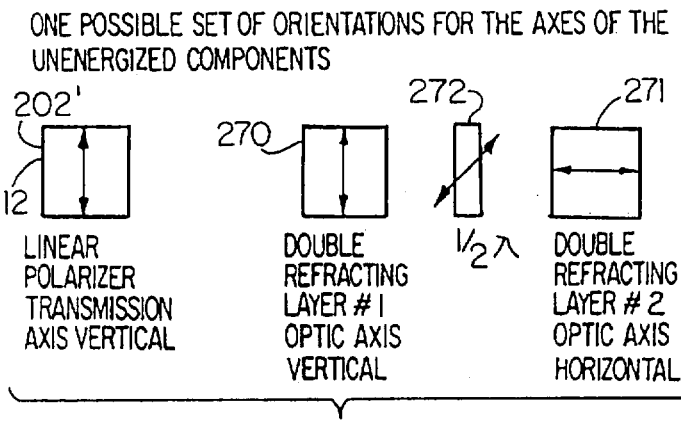

An embodiment of display system 203' which uses a pair of switchable liquid crystal cells 270, 271 associated with a liquid crystal display 202' is shown in FIGS. 18 and 19. Each of the liquid crystal cells 270, 271 functions as a combination of birefringent or double refracting material 210h, 210v and as a switch 211h, 211v. The liquid crystal cells may be, for example, aligned like a birefringent liquid crystal cell using nematic or smectic liquid crystal material between a pair of glass plates. The plates are treated so the liquid crystal is aligned generally in the same direction at both plates without twisting; and, therefore is so aligned throughout the cell. The liquid crystal material preferably is tilted, e.g., at 45 degrees, to obtain a desired birefringence characteristic; but although tilted, the projection of the axis of the liquid crystal structure would be in the same plane as the plane of polarization of incident light thereon to obtain the desired birefringence characteristic. The exemplary arrangement of axes of the display system 203' is shown in FIG. 19.

By changing the electrical drive signal to the respective liquid crystal cells 270, 271, the index of refraction characteristics thereof can be changed, and, as a result, the location of the optical signal transmitted therethrough can be changed, e.g., dithered as described herein. For example, for plane polarized light incident on liquid crystal cell 270 which has liquid crystal therein structurally aligned such that the light experiences the ordinary index of refraction of the liquid crystal and no birefringence, the light will transmit directly through the liquid crystal cell without refraction. However, if the liquid crystal is structurally aligned such that the light experiences the extraordinary index of refraction and, thus, birefringence, the light will be refracted at the interface between the liquid crystal material and the glass plate or the like of the liquid crystal cell, for example; and the light will be refracted again at the interface between the liquid crystal and the other plate of the liquid crystal cell so as to be parallel with the light incident on the liquid crystal cell 270 but displaced from the extension of the transmission axis of the incident light.

Thus, by selectively operating, e.g., energizing and deenergizing or changing energization level, the liquid crystal cells 270, 271, then, can change the direction of the optical signal output by the display system 203'. The liquid crystal should be aligned to present to the light transmitted therethrough either the ordinary or extraordinary axis or index of refraction and appropriate birefringence characteristic as described above. If only one liquid crystal cell 270 is used, the optical signal can be changed back and forth in one plane or direction. If two liquid crystal cells 270, 271 (like the cell 270, for example) are used and are arranged such that the axes thereof are non parallel, then the optical signal can be changed back and forth in two planes or directions. Such non-parallel alignment may be perpendicular alignment to obtain up/down dithering and left/right dithering relationships. Since the plane of polarization of light incident on the liquid crystal cell 271 should be parallel to the axis of that cell, a half wave plate may be placed between the liquid crystal cells 270, 271 to rotate the plane of polarization of the light exiting the liquid crystal cell 270. For example, the axis of such half wave plate may be oriented at 45 degrees relative to the plane of polarization, i.e., half way between the 90 degrees desired rotation. It is noted that a polarizer 12 is shown in FIGS. 18 and 19; such polarizer helps assure the quality of polarization of the light from the display; but such polarizer can be eliminated if the output from the display is of sufficient quality of polarization, e.g., minimal amount of unpolarized light included therein.

Figure 20:
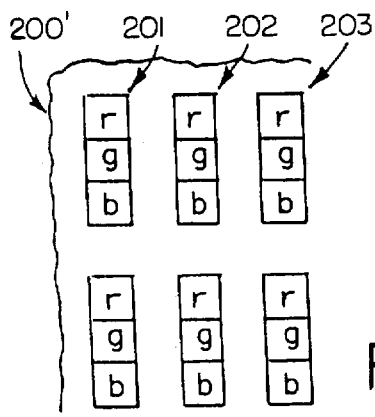
FIG. 20 is a schematic illustration of part of a red, green and blue pixel arrangement for a multicolor display.
Figure 21:
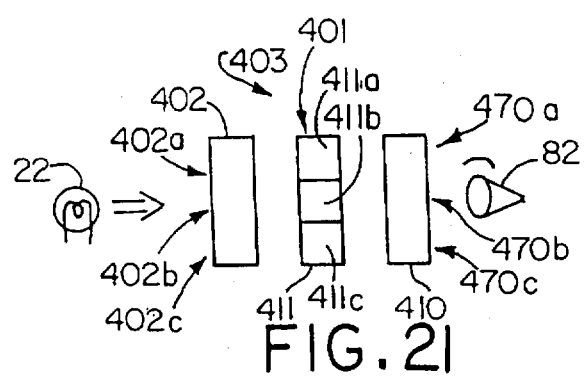
FIG. 21 is a schematic illustration of a segmented display system with selective time sequenced dithering of respective segments.

The EDS 1, 201 may be used in a display system 3, 13, 103, 203, etc. which is monochrome or multicolor. Operation for a monochrome display system would be, for example, as is described above. Operation for a multicolor, such as a red, green and blue (rgb), display system can employ the above-described type of operation for each color. Therefore, when one color or a group of colors is being displayed by respective pixels of such a color display, the optical signal output can be either transmitted without displacement or with displacement in the manner described above. As is depicted schematically in FIG. 20, part of a display 200' is shown including three representative adjacent pixels 201, 202, 203, each including a red, green and blue portion. The display 200' may be operated in a color frame sequential mode in which respective red, green and blue frames or images are produced in time sequence. In this case all red portions of respective pixels 201, 202, 203, etc. would be red where it is desired in the final image to have red light; subsequently green and then blue portions of the image would be created. Alternatively, the respective red, green and blue portions of respective pixels can be displaying respective colors simultaneously. In either case, the principles of the invention using the EDS 1, 101, etc. may be used to increase resolution of the output image in the above-described manner.

However, the EDS may be used for the purpose of selectively dithering (displacing) less than all of the color flames of a multicolor display, especially if the display is operated in a color frame sequential mode. For example, the dithering function can be used selectively to displace or not the green optical signal (light produced during the green frame) of the display 1, 13, 99, 103, 203, 200'; however, the EDS would not be used selectively to dither the optical signal during one or both of the other color frames. Since the human eye is more sensitive to green light than to red or blue light, a significant enhancement of the apparent resolution of the multicolor display can be achieved by only selectively dithering the green light optical signal. If desired, the green and red optical signals can be selectively dithered without selectively dithering the blue optical signal; and this will result in an even greater apparent resolution of the multicolor display than if only the green optical signal were selectively dithered. Since the human eye is not as sensitive to blue light as it is to red or green light, the fact that resolution of the blue light or blue frame component of the overall image is not enhanced by the dithering of the invention will not significantly reduce the resolution of the composite multicolor output image. By reducing the amount of dithering required, it is possible that the complexity and/or cost of the electronic drive and timing circuitry employed in the invention can be reduced.

Figure 22A:
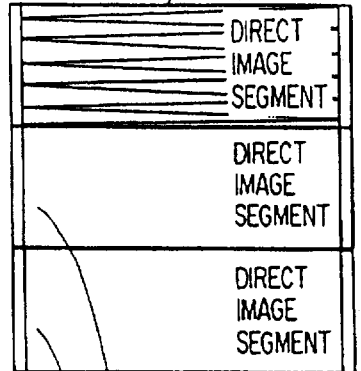
FIGS. 22A–22F are schematic illustrations of the segmented display system of FIG. 21 showing the time sequence of operation thereof.
Figure 22D:
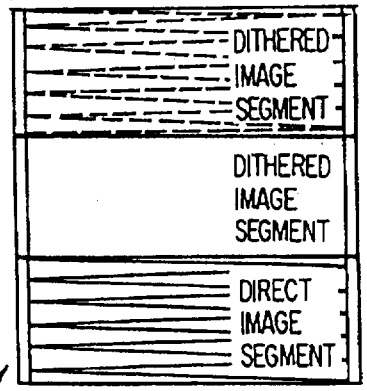
Figure 22B:
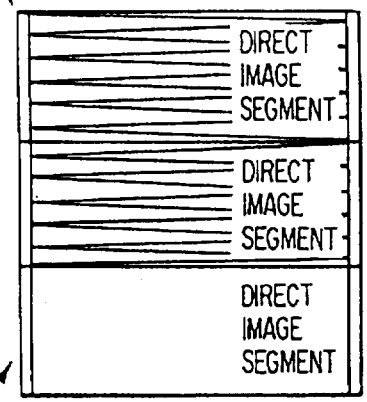

Referring to FIGS. 21, and 22A–22F, there is shown a schematic illustration depicting a time sequence of operation of the invention using a segmented display system 403. FIG. 22A represents the output operation of the display system 403 at one period of time; FIG. 22B represents operation at the next period of time; and so on. In FIGS. 22A–22F the various parts which correspond to parts described above are identified by the same reference numerals but increased to a 400 series. Thus, display system 3, 13, 99, 103, 203', etc. in FIGS. 21 and 22A–22F is designated 403, for example.

The face 470 of the display 403 in FIGS. 21 and 22A–22F is divided into three separate segments 470a, 470b, 470c. More specifically, the display 402 may include a CRT or an LCD 2, 20, 102, etc., and between the display and the viewer, for example, is at least one, and possibly several in series, electro-optic dithering system 1, 11, 21, 101, as was described in the several embodiments above. For simplicity of description here the display system 403 is described with only one EDS, though.

The EDS 401 includes, for example, a double refracting material 410 and a switch 411 such as a surface mode liquid crystal cell. However, the switch 411 is segmented into several areas which can be separately addressed to change the optical characteristics thereof. The switch 411 is shown in FIGS. 21 and 22A–22F as having three separate segments 411a, 411b, 411c; but it will be appreciated that the switch may have fewer or more segments. Each segment 411a, 411b, 411c can be separately operated to change or not to change the direction of plane of polarization of light transmitted therethrough. Each segment can be a separate liquid crystal cell or each can be part of the same liquid crystal cell which has an electrode arrangement which permits operating of the different parts separately.

Figure 22E:
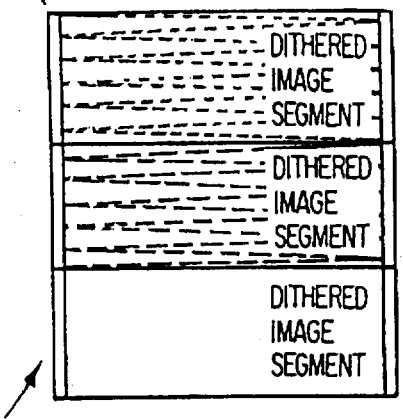
Figure 22C:
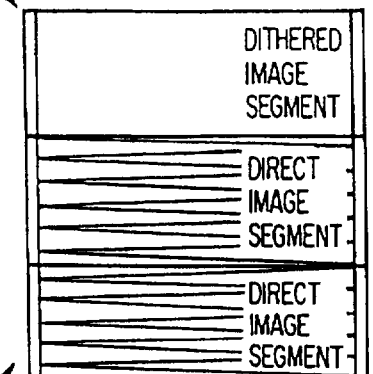
Figure 22F:
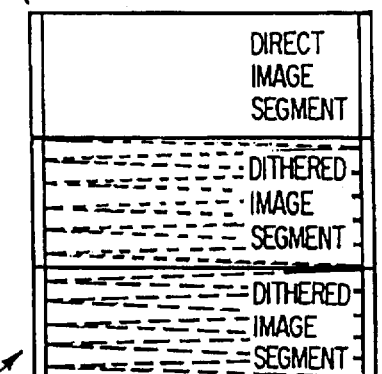

In FIGS. 22A, 22B, 22C the first subframe of information is written sequentially to the upper, middle and lower thirds 402a, 402b, 402c of the display 402 for direct transmission without being dithered or shifted in position. By the time the information is being written to the middle third of the display 402, the information written to the top third begins fading; and by the time the information is being written to the bottom third, the information at the top third is substantially fully faded and that at the middle third is beginning to fade.

In FIG. 22D the start of information representing the second subframe being written to the display 402, initially to the top third 402a of the display, is shown. The dithered information optical signal in the top third of FIG. 22D is represented by the illustrated dashed lines. Since such information is for the second subframe, the optical signal output is intended to be dithered/changed; however, at this time the image or optical output presented by the middle third 402b of the display 402 has not completely faded. Therefore, if the optical output of the entire display 402 were dithered at this time, the optical information or optical output signal still being displayed at the middle third would be shifted to an incorrect location. To avoid this wrongful shifting of the optical signal from the middle third at this time, only the top third 402a of the display 402 is dithered. Preferably the top third actually is dithered when the previous image there has faded; and that actually can occur at the time period represented in FIG. 22C.

At the time period represented by FIG. 22D the middle third of the display 402 has faded, and is dithered; and at the time period represented by FIG. 22E, information is written to that dithered middle third of the display, and the bottom third which has faded is dithered. At the time period represented by FIG. 22F, the dithered image information is written to the bottom third of the display 402 and the top third is dithered since the information previously written there by now has faded.

The above-described operation of the display system 403 can continue sequentially as the respective subframes are sequentially displayed, e.g., the optical signals comprising such subframes are presented as the output of the display system. In each subframe the different respective parts or segments are sequentially dithered or not preferably so that a segment is already undithered or dithered before the raster, line, row, etc. of information to form the optical signal is written to the respective pixels of that segment. The dithering or undithering switching action, e.g., operation of the switch 11 from one state to the other, also can be carried out as the action of writing information to a segment is carried out; but ordinarily it would be better to effect the dithering or undithering when the segment is relatively blank (e.g., information there has faded) to avoid undertaking a dithering or undithering action while an optical output is being displayed.

It will be appreciated that the segmentation technique may be used with a display system which uses a CRT display, a liquid crystal display or some other type of display. The segmented switch 411 approach also is useful to remove artifacts caused by a relatively slow acting LCD.

Further, it will be appreciated that the various EDS embodiments of the present invention and display systems using such EDS embodiments are operative to move an output optical signal from one location to another without substantially affecting brightness of the display system or optical signal. The components of the EDS generally are optically transparent, and, therefore, other than a relatively minor amount of absorption of light transmitted therethrough, there may be otherwise relatively little reduction in light intensity. Therefore, the features of the invention may be used for the various purposes described herein, for example, to increase resolution, to cover or to reduce the effective optical dead space, etc., without reducing brightness of the optical output.

Figure 23:
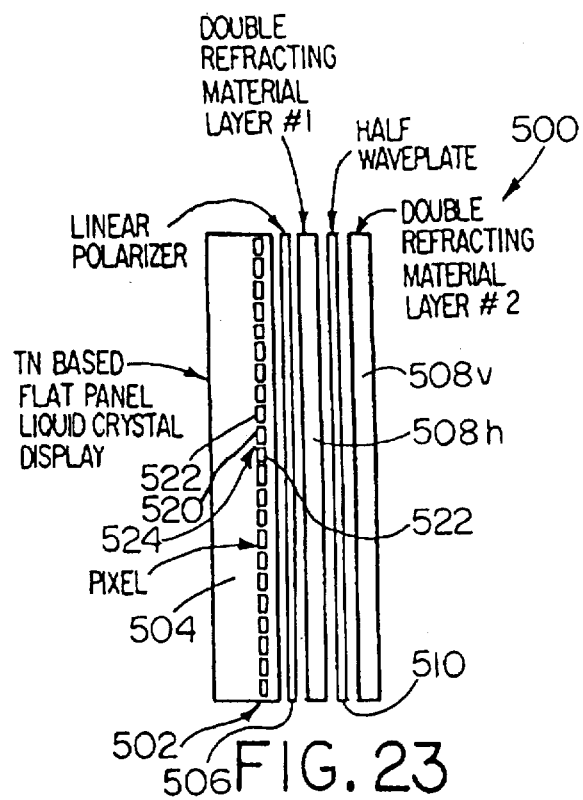
FIG. 23 is a schematic illustration of a passive dithering system used in connection with a display which produces a polarized output.

A passive dithering system 500 in accordance with one aspect of the present invention is illustrated schematically in FIG. 23. The passive dithering system 500 as shown is used in connection with a display 502 which produces an output of polarized light, such as might be produced by a twisted nematic (TN) based flat panel liquid crystal display 504 incorporating a linear polarizer 506 or by a CRT display with an added linear polarizer interposed between the CRT display and the dithering system 500. The dithering system 500 includes a pair of double refracting or birefringent material layers 508h, 508v, such as a calcite crystal material, separated by a half waveplate 510. The effect of the passive dithering system 500 is to enhance the resolution of the display output by reducing fixed pattern noise in the display.

Figure 24A:
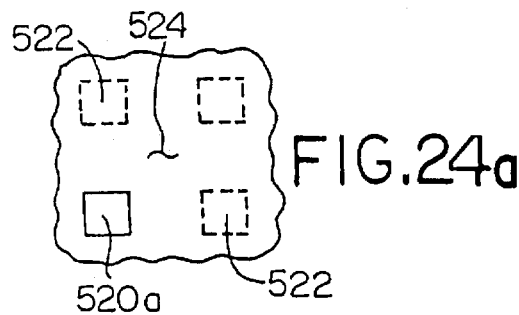
FIG. 24A–24C is a schematic illustration of the effect of dithering in both horizontal and vertical directions.

As a very generalized example of the function of the passive dithering system 500, consider an image 520a created by a single pixel 520 of the flat panel liquid crystal display 504 separated from adjacent pixels 522 in the display by optical dead space 524 as is shown in FIG. 24a.

Figure 24B:
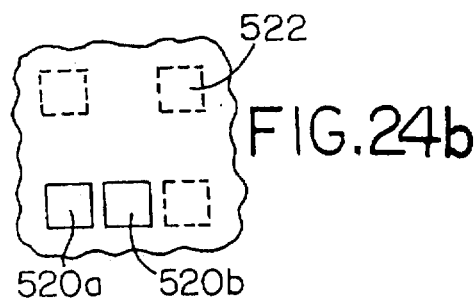
Figure 24C:
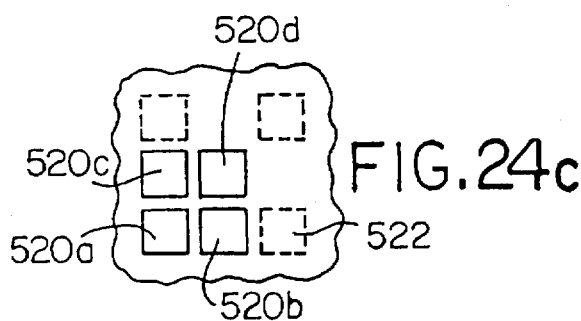

The birefringent material 508h effectively creates a double image 520b of the image 520a which is displaced or dithered in, for example, a horizontal direction, as is shown in FIG. 24b. The second birefringent material 508v, which receives both images 520a and 520b, creates a second pair of images 520b, 520c displaced vertically from the first pair of images as is shown in FIG. 24c. In this way, the image produced by a single pixel, such as exemplary pixel 520, can be made to fill the optical dead space 524 between the pixels 522 which is typically used to electrically isolate adjacent pixels and to accommodate circuitry and electrical components.

One possible manner of orienting the axes of the optical components of the passive dithering system 500 is shown in FIG. 25. The linear polarizer or polarized display output is oriented vertically so that an image emerging from the polarizer or display will be linearly polarized in a vertical direction. The birefringent material 508h is arranged relative to the linear polarizer with the projection of its optic axis into the plane of the polarizer being at a −45 degree angle relative to the transmissive axis of the polarizer. The axis of the half waveplate is oriented at +22.5 degrees to vertical, and the second birefringent material 508v is oriented with the projection of its optic axis into the plane of the polarizer being +45 degrees to vertical. It will be appreciated, however, that this arrangement is only one of many possible arrangements of the axes of the components which would produce the dithering effect described herein.

With further reference to FIG. 25, which additionally illustrates the path of an image through the passive dithering system 500, the path of the exemplary pixel image 520a through the system will be described in greater detail. As oriented, the linear polarizer 506 transmits optical information in the form of pixel images from pixels in the display which have effected the light transmitted therethrough so as to be polarized in the direction of the transmissive axis of the linear polarizer. For the exemplary image 520a, the light would thus be polarized in a vertical direction.

Since the plane of polarization of the image 520a is at a 45 degree angle to the optic axis of the birefringent material 508h; the image 520a will be resolved into orthogonally polarized components lying parallel to and perpendicular to the axis of the birefringent material, as schematically shown at 526. As the orthogonally related polarized components pass through the birefringent material 508h, one of the polarized components will be refracted and deflected horizontally while the other component will be unaffected. As a result, the birefringent material 508h will yield two images, an image 520a in its original location and a horizontally displaced image 520b with the images being polarized orthogonally to one another.

The images 520a and 520b then pass through the next optical component in the passive dithering system 500, the half waveplate 510, where the plane of polarization of each of the images 520a and 520b is effectively rotated −45 degrees so that the plane of polarization of each image will be oriented at 45 degrees relative to the optic axis of the second birefringent material 508v, as indicated at 528. Since the plane of polarization of each of the images 520a and 520b is now at a 45 degree angle to the axis of the birefringent material 508v, the images 520a and 520b will be resolved into their orthogonally polarized components indicated at 530 and, as these components pass through the birefringent material, one of the polarized components of each image will be refracted and deflected vertically to result in images 520c and 520d while the other component will be unaffected. As a result, the original image 520a is dithered into four images 520a, 520b, 520c and 520d of substantially equal intensity.

While the passive dithering system 500 discussed above was illustrated as doubling images in two directions, horizontal and vertical, a passive dithering system that doubling the image in a single direction only is also possible. Such a system would include a single birefringent material used in conjunction with a display producing a polarized or non-polarized output to result in a doubled pixel image or to perform passive line doubling.

Referring to FIG. 26, there is shown a passive dithering system 500' used in connection with a display 532 which produces non-polarized light, such as an encapsulated liquid crystal (NCAP) or polymer dispersed liquid crystal (PDLC) based flat panel liquid crystal display. The passive dithering system 500' of FIG. 26 includes the same optical components as the dithering system 500 described above relative to FIG. 24, such as a birefringent material 508h', a waveplate 510' and a second birefringent material 508v'. In this instance, neither the passive dithering system 500' nor the display 502' is provided with a linear polarizer to polarize the output light from the display 532.

In operation, the passive dithering system 500 when used in connection with a display producing non-polarized light will result in horizontal and vertical pixel image doubling similar to that produced by the passive dithering system 500 and shown in FIGS. 24a through 24c. In fact, the orientations of the optic axes of the components 508h', 510' and 508v' may be the same as when those components are used in connection with a display producing a polarized output.

One possible set of orientations for the optic axes of these components is shown in FIG. 27. The projection of the optic axis of the first birefringent material 508h' into the plane of the page is at −45° to vertical, the axis of the half waveplate 510' is at +22.5° to vertical and the projection of the optic axis of the second birefringent material 508v' into the plane of the page is at +45° to vertical. Although the light which enters the first birefringent material 508h' is non-polarized, it can be visualized as polarized light resolved into two orthogonal components such as a vertical and horizontal polarized component as shown for the exemplary pixel image 534a created by a corresponding pixel 534 in the display 532.

The components 508h', 510' and 508v' then function basically as described above in FIG. 25. The first birefringent material 508h' will resolve the individual components of the pixel image 534a into their orthogonal components and will dither one component relative to the other polarized component to produce a horizontally displaced double image of the pixel image 534a. The half waveplate will then rotate the polarization components of those images so they are at 45° angles to the optic axis of the second birefringent material 508v' where the images will be doubled and displaced in a vertical direction. As a result, the initial image 534 is doubled in the horizontal direction and then the initial image and the doubled image are doubled in the vertical direction to produce four adjacent images which substantially cover the portion of the original pixel in the display and dead space surrounding the pixel in one vertical and horizontal direction.

FIG. 28 illustrates an alternate embodiment of a passive dithering system 540 shown employed in connection with an optical display which produces linearly polarized output light, such as by a twisted nematic based flat panel liquid crystal display 542 incorporating a linear polarizer 544. The passive dithering system 540 includes a first birefringent material 546h, a second birefringent material 546v and a quarter waveplate 548 interposed between the birefringent materials 546h and 546v. One possible set of orientations for the axes of the linear polarizer 544 of the display, the birefringent materials 546h and 546v and the quarter waveplate 548 is shown in FIG. 29. The linear polarizer has a transmissive axis in the vertical direction. The projection of the optic axis of the first birefringent material 546h into the plane of the linear polarizer is oriented −45° to vertical. The axis of the quarter waveplate is vertical and the projection of the optic axis of the second birefringent material 546 into the plane of the linear polarizer is at +45° to vertical.

The passive dithering system 540 functions basically the same way as the passive dithering system 500 is described above relative to FIG. 25. The function of the half waveplate 510 in the passive dithering system 500 has been replaced in the system 540 by a quarter waveplate 548. The quarter waveplate 548 effectively rotates the polarization components of light passing through the waveplate by −45° by converting the light to circularly polarized light. The components of the circularly polarized light are then dithered by the second birefringent material 546v in a vertical direction as explained above for the passive dithering system 500. One advantage of using the quarter waveplate 548 as opposed to the half waveplate 510 or 510' is that the quarter waveplate 548 will tend to introduce less chromatic aberration on the light passing therethrough since the thinner material is less dispersive.

FIG. 30 illustrates a passive dithering system 540' which is identical to the passive dithering system 540 shown in FIGS. 28 and 29 but it is used in connection with a display producing non-polarized output light, such as an NCAP or PDLC based flat panel liquid crystal display 550. The orientation of the birefringent materials 546h' and 546v' and the quarter waveplate 548' may be the same as those described for the like components for the passive dithering system 540 although it would be appreciated that this is only one possible set of orientations for the axes of the components which would dither an image in the manner described above. The passive dithering system 540' functions in basically the same way described above for the system 540 but on unpolarized input light as opposed to the linearly polarized light which the system 540 receives from the display 542.

It also will be appreciated that the several features and embodiments of the invention illustrated and/or described herein may be used with other features and embodiments that are illustrated and/or described herein as well as equivalents thereof. For example, in the segmented display system described the EDS may be formed by a calcite crystal and a surface mode liquid crystal cell, by a calcite crystal and a twisted nematic liquid crystal cell or by some other type of switch and/or some other type of double refracting material. Also, the EDS may be a liquid crystal EDS in which both the switch function and the double refracting function can be carried out by the same device, e.g., as in the embodiment of FIGS. 18 and 19. Moreover, in many instances passive dithering systems may be used in conjunction with or as a substitute for some of all of the components described for the EDS. These are simply examples of combining features and it will be appreciated that other combinations also may be made consistent with the spirit and scope of the invention.

The embodiments of the invention in which an exclusive property or privilege is claimed are set forth in the following claims:

1. A display system, comprising:

an optical display for producing an image; and first birefringent means for refracting one component of the image relative to a second component of the image based on polarization characteristics of said components to produce a plurality of adjacent images, and wherein said optical display produces nonpolarized light.

2. The system of claim 1, including a linear polarizer interposed between said display and said first birefringent means.

3. A display system, comprising:

an optical display including a plurality of pixels with optical dead space between said pixels for producing an image; and birefringent means for shifting one polarization component of the image relative to a second polarization component of the image such that said shifted polarization component lies in said dead space.

4. The system of claim 3, wherein said optical display produces linearly polarized light.

5. The system of claim 3, wherein said optical display produces nonpolarized light.

6. The system of claim 5, including a linear polarizer interposed between said display and said first birefringent means.

7. The system of claim 5, including a second birefringent means for selectively shifting one component of each of the images produced by said first birefringent means relative to a second component of each of the images based on polarization characteristics of said components to produce an additional plurality of adjacent images.

8. The system of claim 7, including a waveplate interposed between said first and second birefringent means.

9. A method of reducing optical background noise, comprising the steps of:

displaying a plurality of pixels with optical dead space between said pixels for producing an image; and shifting one polarization component of the image relative to a second polarization component of the image such that said shifted polarization component lies in said dead space.

* * * * *